(12) United States Patent
Fischl et al.

(10) Patent No.: US 11,060,574 B2
(45) Date of Patent: Jul. 13, 2021

(54) DISC BRAKE FOR A UTILITY VEHICLE, BRAKE PAD AND BRAKE PAD SET

(71) Applicant: KNORR-BREMSE Systeme fuer Nutzfahrzeuge GmbH, Munich (DE)

(72) Inventors: Tobias Fischl, Munich (DE); Wolfgang Pritz, Munich (DE); Andreas Petschke, Neuburg am Inn (DE); Josef Schropp, Eichendorf (DE); Julian Cato Dahlenburg, Georgensgmuend (DE); Markus Bartel, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 150 days.

(21) Appl. No.: 16/196,951

(22) Filed: Nov. 20, 2018

(65) Prior Publication Data

US 2019/0085918 A1 Mar. 21, 2019

Related U.S. Application Data

(63) Continuation of application No. PCT/US2017/057857, filed on Apr. 3, 2017.

(30) Foreign Application Priority Data

May 20, 2016 (DE) .................... 10 2016 109 360.2

(51) Int. Cl.
*F16D 55/227* (2006.01)
*F16D 65/097* (2006.01)
*F16D 55/226* (2006.01)

(52) U.S. Cl.
CPC ......... *F16D 55/227* (2013.01); *F16D 55/226* (2013.01); *F16D 65/0974* (2013.01); *F16D 65/0978* (2013.01); *F16D 2250/0084* (2013.01)

(58) Field of Classification Search
CPC .. F16D 55/226; F16D 55/227; F16D 65/0974; F16D 2250/0084; F16D 65/0978;
(Continued)

(56) References Cited

U.S. PATENT DOCUMENTS 3,933,226 A * 1/1976 Maurice ................ F16D 55/226
188/72.5
6,293,373 B1 9/2001 Weiler et al.
(Continued)

FOREIGN PATENT DOCUMENTS

CN 1108465 C 5/2003
CN 102011816 A 4/2011
(Continued)

OTHER PUBLICATIONS

International Search Report (PCT/ISA/210) issued in PCT Application No. PCT/EP2017/057857 dated Jul. 18, 2017 with English translation (five pages).
(Continued)

*Primary Examiner* — Pamela Rodriguez
(74) *Attorney, Agent, or Firm* — Crowell & Moring LLP

(57) ABSTRACT

A disc brake for a utility vehicle, with a brake caliper which overlaps a brake disc, is preferably designed as a sliding caliper, is fastened to a positionally fixed brake carrier and has a central caliper opening above the brake disc, with an application device for applying the brake, and with two brake pads which are insertable through the caliper opening and each have a pad carrier and a friction pad fastened thereto, of which brake pads the one brake pad, as an application-side brake pad, can be pressed against the brake disc on the one side of the brake disc by the application device, and the other, as a reaction-side brake pad, is arranged on the opposite side of the brake disc, is distinguished in that a holding-down clamp is provided which is
(Continued)

designed in such a manner that it radially secures only one of the two brake pads in the pad slot.

25 Claims, 32 Drawing Sheets

(58) Field of Classification Search
CPC ............. F16D 65/0975; F16D 65/0976; F16D 65/0979
USPC ........... 188/73.38, 73.31, 73.36, 73.37, 73.1, 188/73.32, 205 A, 250 E, 250 G
See application file for complete search history.

(56) References Cited

U.S. PATENT DOCUMENTS

| | | | |
|---|---|---|---|
| 8,016,084 B2 * | 9/2011 | Camilo-Martinez | ........................ F16D 65/0978 188/73.38 |
| 2003/0042085 A1 | 3/2003 | Kang | |
| 2009/0020380 A1 | 1/2009 | Camilo-Martinez et al. | |
| 2009/0211857 A1 | 8/2009 | Camilo-Martinez et al. | |
| 2010/0258384 A1 * | 10/2010 | Kreuzeder | .......... F16D 65/0976 188/1.11 L |
| 2014/0345983 A1 | 11/2014 | Baumgartner et al. | |

FOREIGN PATENT DOCUMENTS

| | | |
|---|---|---|
| CN | 104105900 A | 10/2014 |
| DE | 40 20 287 A1 | 1/1992 |
| DE | 694 00 875 T2 | 3/1997 |
| DE | 10 2009 030 414 A1 | 1/2011 |
| DE | 20 2013 102 650 U1 | 7/2013 |
| DE | 10 2012 110 461 A1 | 4/2014 |
| DE | 10 2014 106 090 A1 | 11/2015 |
| EP | 0 694 134 B1 | 11/1996 |
| EP | 1 963 702 B1 | 3/2010 |
| EP | 2 255 101 B1 | 6/2011 |
| EP | 2 923 104 B1 | 5/2018 |
| FR | 2 061 830 A5 | 6/1971 |
| FR | 2 437 528 A1 | 4/1980 |
| GB | 2 031 085 A | 4/1980 |
| JP | 2007-155024 A | 6/2007 |
| WO | WO 2012/111828 A1 | 8/2012 |
| WO | WO 2014/079869 A1 | 5/2014 |

OTHER PUBLICATIONS

German-language Written Opinion (PCT/ISA/237) issued in PCT Application No. PCT/EP2017/057857 dated Jul. 18, 2017 with English translation (eight pages).
German-language Office Action issued in counterpart German Application No. 10 2016 109 360.2 dated Mar. 14, 2017 (nine pages).
Chinese-language Office Action issued in counterpart Chinese Application No. 201780042403.4 dated Nov. 14, 2019 with English translation (nine (9) pages).

* cited by examiner

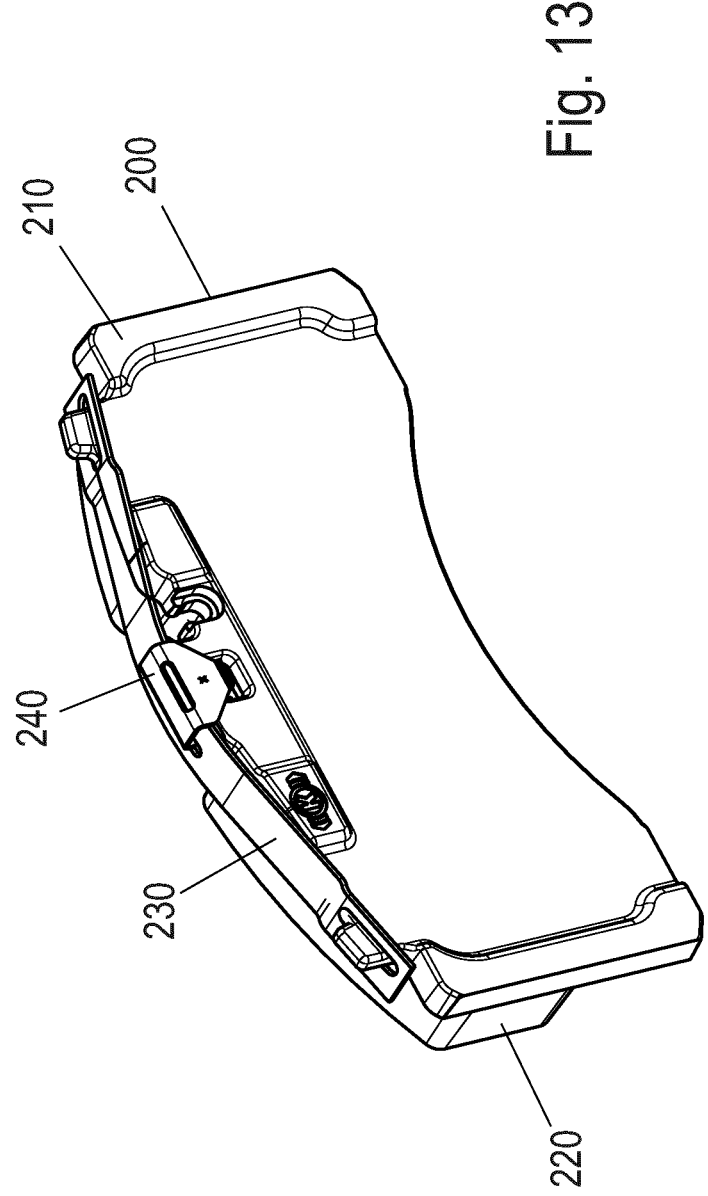

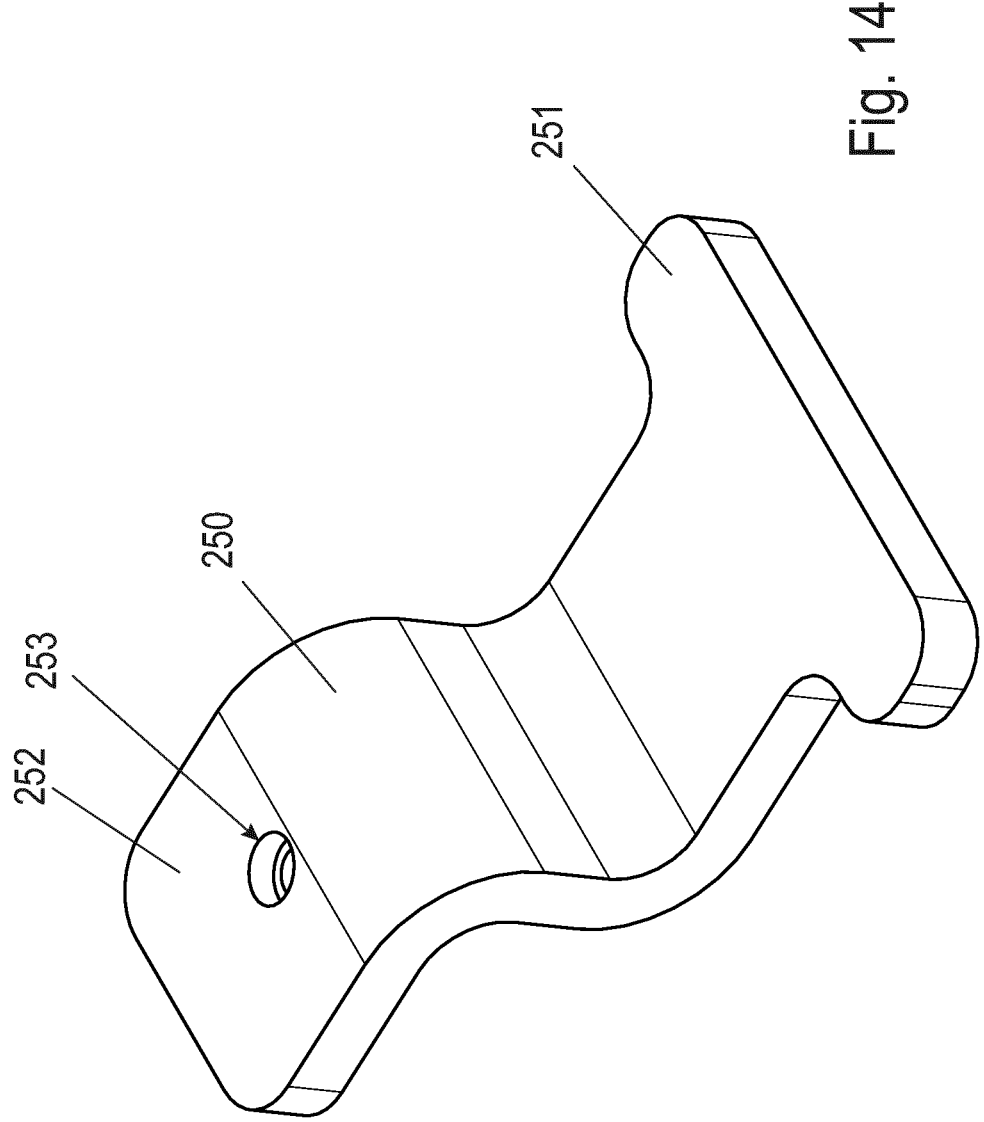

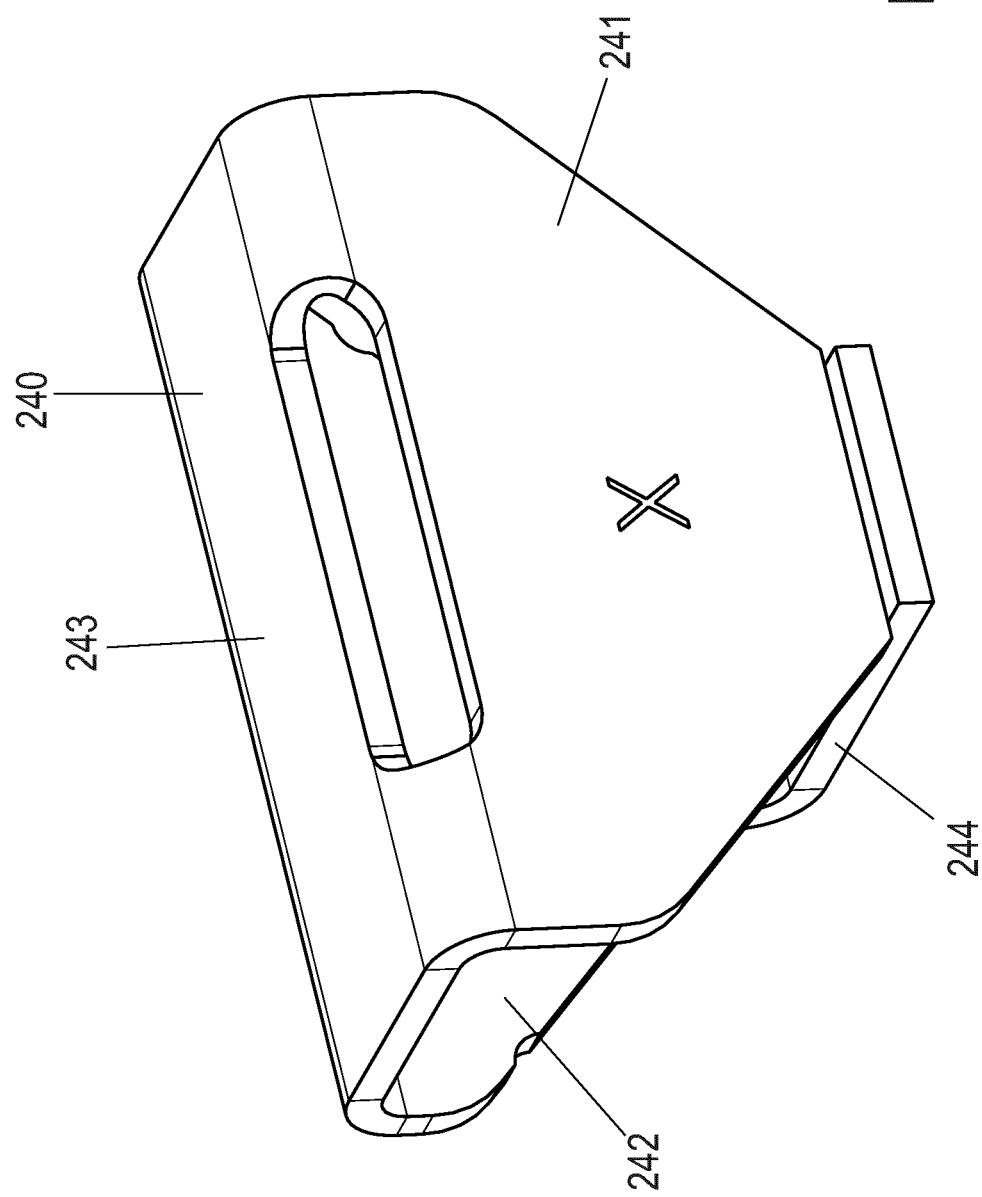

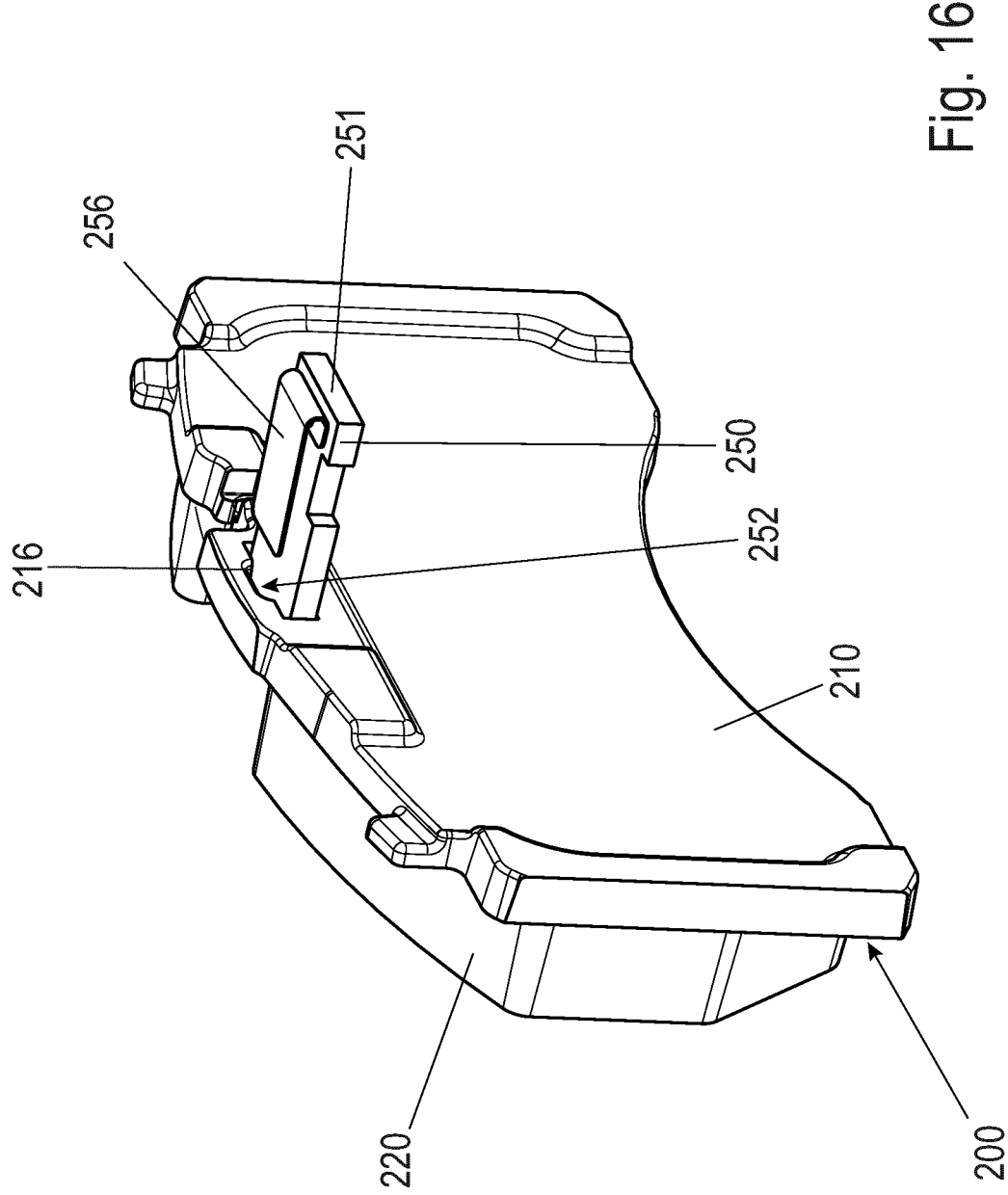

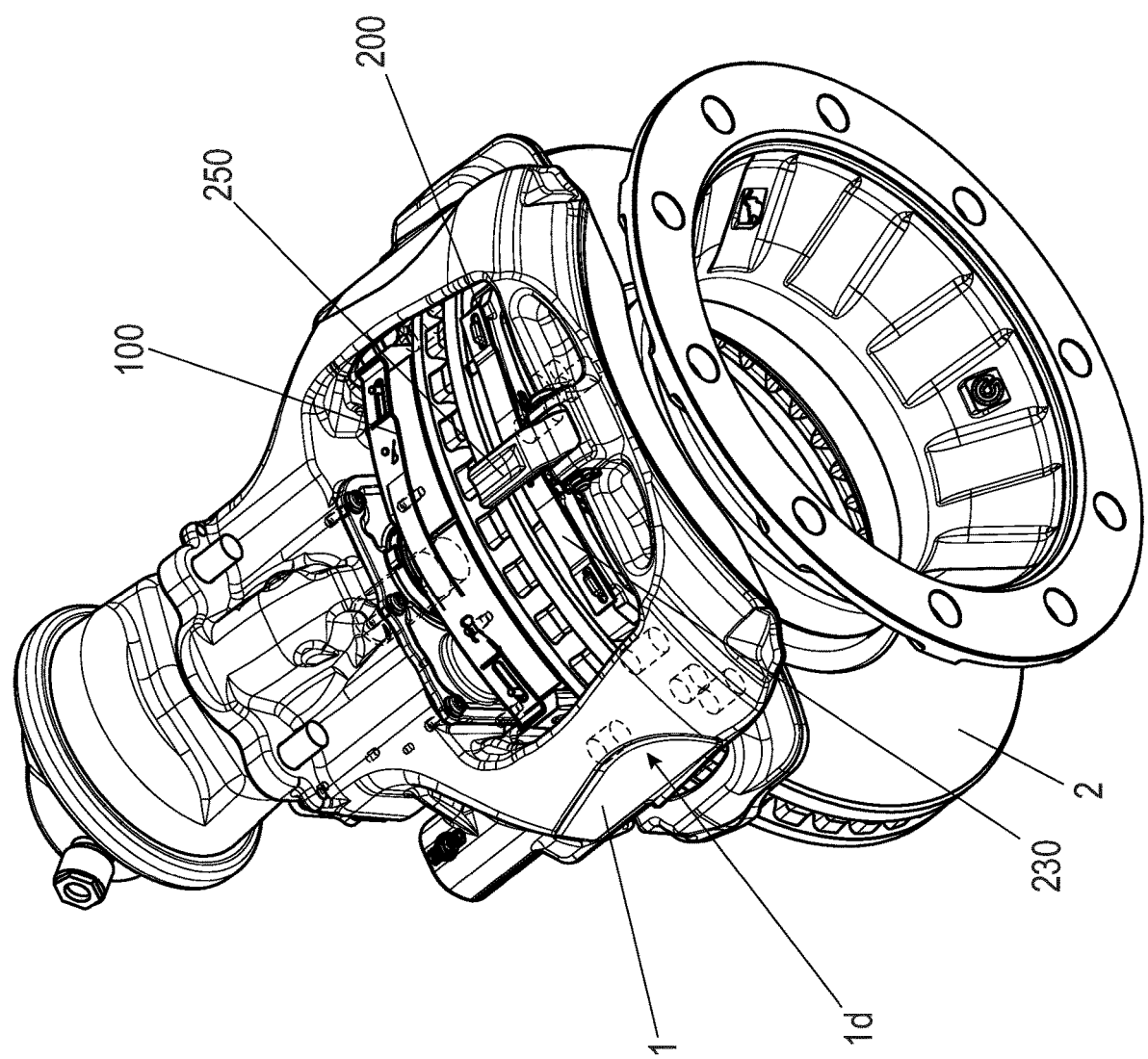

DISC BRAKE FOR A UTILITY VEHICLE, BRAKE PAD AND BRAKE PAD SET

CROSS REFERENCE TO RELATED APPLICATIONS

This application is a continuation of PCT International Application No. PCT/EP2017/057857, filed Apr. 3, 2017, which claims priority under 35 U.S.C. § 119 from German Patent Application No. 10 2016 109 360.2, filed May 20, 2016, the entire disclosures of which are herein expressly incorporated by reference.

BACKGROUND AND SUMMARY OF THE INVENTION

The invention relates to a disc brake for a utility vehicle, having a brake caliper which engages over a brake disc and which is preferably designed as a sliding caliper and which is arranged on a positionally fixed brake carrier, and having an application device for applying the brake, two brake pads which each have a pad carrier and a friction pad fastened to said pad carrier and of which one, as an application-side brake pad, can be pressed by means of the application device against the brake disc on one side of the brake disc and of which the other, as a reaction-side brake pad, is arranged on the opposite side of the brake disc and which are each inserted into a pad slot, wherein the brake caliper has a central caliper opening over the brake disc, through which caliper opening the two brake pads can be inserted into the pad slot. The invention also relates to a brake pad for such a disc brake and to a brake pad set for such a disc brake.

In the case of a generic disc brake designed in particular as a sliding caliper brake, in a braking situation, an action-side brake pad is pressed against a brake disc on the vehicle by means of an application device, which is actuatable pneumatically or by electric motor. During the further course of the braking process, the brake caliper is, in relation to the brake disc, displaced counter to the application direction of the action-side brake pad, with the opposite, reaction-side brake pad being driven along and pressed against the other side of the brake disc.

With regard to the prior art, DE 40 20 287 A1 is firstly mentioned. According to said document, in each case one pad spring designed as a leaf spring is provided on the two brake pads. The pad carriers, after being inserted into their pad slot, are in each case held by means of the pad spring, which pad springs are in turn, in the mounted position, secured jointly by means of a holding clip which acts on the leaf spring from the top side and which extends in a transverse direction with respect to the longitudinal axis of the leaf spring. For the fixing of the pad spring, lugs provided with undercuts are integrally formed on the pad carriers (or the pad carrier plate), which lugs extend through slot-like recesses in the pad spring, which recesses in this case engage behind the undercuts, such that a form fit is realized by means of which the pad spring is held in a radial direction, specifically such that they are prevented from being released of their own accord in a relaxed or partially relaxed state. Further similar prior art is presented in DE 10 2014 106 090 A1. According to said documents, the brake caliper has in each case one central caliper opening over the brake disc, through which the two brake pads are insertable into the pad slots, which permits a simple exchange of the brake pads. On the other hand, it makes this necessary. The brake pads in the pad slots are also easy to secure radially—outward in relation to the brake disc axis of rotation in the context of this application.

In the case of fixed-caliper brakes, this problem does not exist in this form, because, there, a strut is generally led across the brake disc, which strut may duly have a ventilation opening but, owing to its dimensioning, is not envisaged and designed with regard to a pad change. A pad retaining clip which extends over the caliper opening is thus not required.

The solution described in the introduction is further developed in each case in the patents EP 1 963 702 B1 and EP 2 255 101 B1. By means of these solutions, by means of a cover which is fixed to the pad carrier and which is preferably radially movable relative thereto and which is extended through by the pad spring or by a part of the pad spring, it is achieved that the pad spring is always reliably braced in load-transmitting fashion in particular in the loading region.

With regard to the technological background, the documents EP 0 694 134 B1, DE 10 2012 110 461 A1 and WO 2014/079 869 A1 are also cited.

The invention is based on the object of further developing a disc brake of the generic type such that good braking characteristics are achieved with structurally simple means. A further object consists in providing a corresponding brake pad and a corresponding brake pad set.

According to the invention, there is provided a disc brake for a utility vehicle, having a brake caliper which engages over a brake disc and which is preferably designed as a sliding caliper and which is arranged on a positionally fixed brake carrier, and having an application device for applying the brake, and having two brake pads which each have a pad carrier and a friction pad fastened to said pad carrier and of which one, as an application-side brake pad, can be pressed by way of the application device against the brake disc on one side of the brake disc and of which the other, as a reaction-side brake pad, is arranged on the opposite side of the brake disc, wherein the brake pads are each inserted into a pad slot—or can be inserted during mounting (so that they have to pass through this opening)—and wherein the brake caliper has a central caliper opening over the brake disc, through which caliper opening the two brake pads can be inserted into the respective pad slot. Here, a hold-down clip is additionally provided which is designed so as to radially secure only one of the two, but preferably not imperatively, of the reaction-side brake pads in its pad slot, wherein the hold-down clip is, with one end or its end averted from the reaction-side brake pad, held on the brake caliper, in particular is held there releasably or non-releasably.

Firstly, in this way, an advantageous disc brake and a particularly advantageous reaction-side or application-side brake pad are created, the latter having a simple and short structural form which is advantageously limited to the function of holding down this one brake pad. The short hold-down clip leads to a weight and cost reduction of the brake owing to the reduced use of material.

It is advantageous that the hold-down clip engages over only one of the two brake pads entirely or partially axially parallel with respect to the brake disc in order to secure said brake pad. In this way, said pad is, as it were, held radially "from above" in the pad slot of the brake carrier or of the brake caliper and secured against (excessively large radial) movements. Here, the held-down pad can be insertable into a pad slot of the brake carrier or of the brake caliper. In a particularly preferred variant, both brake pads are arranged in pad slots of the brake carrier and can be inserted through the opening in the brake caliper—which for the brake pads is a mounting opening—into said pad slots, specifically substantially radially from above, and possibly additionally by means of a relatively small axial movement. A brake carrier with pad slots on both sides of the brake disc is very stable and advantageous. The pad slot supports the pad in the circumferential direction and radially downward toward the brake disc. Upwardly, the axially "short" hold-down clip then secures the one brake pad so as to prevent it from falling out and from performing excessively large radial movements, possibly with assistance from an interposed spring. The other brake pad is radially secured in some other manner—not by the same hold-down clip.

Securing of the reaction-side brake pad with the "short" hold-down clip has the advantage that it is easy to realize, in particular if said reaction-side brake pad is held axially immovably in the brake caliper and, during braking operations, is not displaced relative to the brake caliper in particular in the region of its back plate.

Here, in variants, the hold-down clip may be releasably or non-releasably fastened to the brake caliper or formed in one piece therewith.

An optional embodiment of the hold-down clip with said brake pad as a structural unit is advantageous, which structural unit is exchanged as a whole during a pad change. This is simple and leads to a simple and reliable renewal of all elements to be exchanged in the "reaction-side pad" structural unit (brake pad, pad spring, if provided: cover and hold-down clip).

The hold-down clip may lie on the pad carrier or engage behind, and thus interact with, said pad carrier. Said hold-down clip may also interact with said pad carrier in form-fitting fashion, and for example engage with a projection in form-fitting fashion into said pad carrier in the region of a corresponding depression (or vice versa).

As one possible—particularly advantageous—variant, the hold-down clip may be captively connected to the pad, in particular captively connected to the pad carrier. This has the advantage that said assembly is fully installed, and thus incorrect installation is ruled out. Incorrect installation means in this case that the back plate would be installed toward the brake disc.

Here, various types of connection between hold-down clip and brake pad are possible. The connection may be realized by means of a cover, wherein here, one or more lugs are provided which fully or partially engage around the hold-down clip and are subsequently mounted by means of welding, riveting, wobbling or similar methods such that dismounting is no longer possible without destruction of a component. The engaging-around configuration may be rearward, as illustrated in the sketches, or upward.

The connection may also be realized by way of a collar bolt which for example engages through the hold-down clip and is welded or riveted (in cohesive, force-fitting or form-fitting fashion) to the cover.

The connection may also be realized by way of a bolt which is fastened fixedly or displaceably in the pad back plate.

The hold-down clip may also engage partially or fully through the pad back plate. In the case of such a variant, a spring is subsequently permanently fastened to a hold-down clip, such that the hold-down clip—as already mentioned above—is captively connected to the pad.

In a further concept, the pad retaining spring may be relocated away from the pad. In a region remote from the pad, the prevailing temperatures are generally lower than directly at the pad, which has a positive effect on the service life and on the greater possibilities for selection of spring materials. Since the springs are protected against corrosion with a coating, in the case of which the temperature likewise has an effect on service life, an improvement could also be realized here. The hold-down clip is in this case connected fixedly, or with play for tolerance compensation, to the pad. In this case, the spring pushes the hold-down clip downward. By means of the hold-down clip, the pad is pushed downward onto the brake carrier. This spring action may be realized by means of different spring designs, for example leaf spring, spiral spring, leg spring, . . . .

Arresting or holding of the hold-down clip on the pad and/or on the brake caliper may be realized easily by one or more fasteners, in particular bolt(s) or bracket(s) or one or more screws.

It is thus contemplated, and advantageously simple, for the hold-down clip to be non-releasably fixed to a part of the reaction-side brake pad. It may for example also be cohesively fastened to the pad carrier, for example by welding.

According to the invention, there is further provided an advantageous brake pad for a disc brake, which brake pad has a pad carrier and a friction pad fastened thereto, which brake pad is designed for interacting with the hold-down clip. The hold-down clip and the brake pad may—though need not imperatively—form a structural unit here.

Here, the hold-down clip is preferably designed such that it radially secures only one of two of the two brake pads in its pad slot on a disc brake.

Here, it is particularly advantageous if the hold-down clip is fixed to the reaction-side brake pad, because said reaction-side brake pad is axially fixed in the brake caliper and is not displaced therein with increasing wear. The invention can thus be easily realized here. The invention is however not restricted to this variant.

In a further advantageous variant, a cable bridge is provided on which at least one signal cable is arranged and held, which cable bridge bridges the opening of the brake caliper and is fastened directly or indirectly to the brake caliper in at least two regions. In this way, despite the "short" hold-down clip, a signal cable can be laid across the opening of the brake caliper in an effective manner.

Also provided is a brake pad set having a reaction-side brake pad and having an application-side brake pad which is secured radially in the brake carrier by means of at least one form-fit element on the pad carrier. In this way, this brake pad on the application side requires no hold-down clip for radial securing purposes. Furthermore, said pad reduces the effect of oblique wear. According to one realization of the invention, the reaction-side pad need not imperatively also have this structural form. Said reaction-side pad may rather also be designed without projections. Then, the "short" hold-down clip is particularly advantageous. Altogether, in this way, a very inexpensive disc brake is created which has two brake pads optimally adapted to their tasks as pad set.

Summarized briefly, what is also advantageously provided is a disc brake for a utility vehicle, having a brake caliper which engages over a brake disc and which is preferably designed as a sliding caliper and which is fastened to a positionally fixed brake carrier and has a central caliper opening above the brake disc, having an application device for applying the brake, and having two brake pads which can be inserted through the caliper opening and each have a pad carrier and a friction pad fastened to said pad carrier and of which one, as an application-side brake pad, can be pressed by means of the application device against the brake disc on one side of the brake disc and of which the other, as a reaction-side brake pad, is arranged on the opposite side of the brake disc, and wherein a hold-down clip is provided which is designed so as to radially secure or hold down only one of the two brake pads radially relative to the brake disc axis of rotation in the pad slot.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 13 shows the brake pad of the arrangement from FIGS. 11 and 12.

FIG. 14 shows the hold-down clip of the arrangement from FIG. 11.

FIG. 15 shows a cover of the brake pad from FIGS. 13 and 14.

FIG. 16 shows a further variant of a reaction-side brake pad with a hold-down clip arranged thereon.

DETAILED DESCRIPTION OF THE DRAWINGS

Figure 1A:
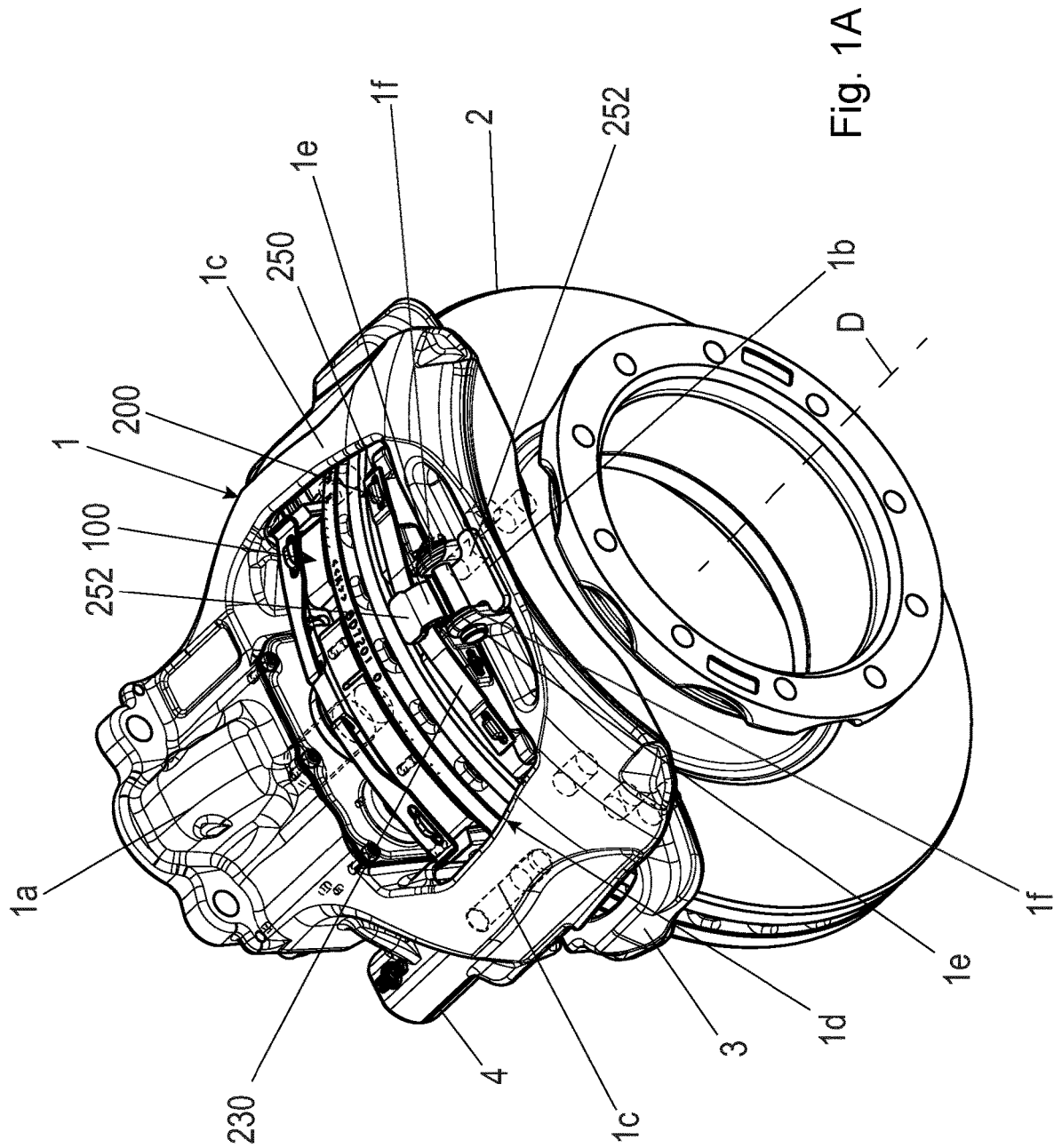
FIG. 1A shows a perspective view of a first disc brake according to the invention and, in FIG. 1B shows a view of a brake carrier of the disc brake from FIG. 1A.
Figure 2:
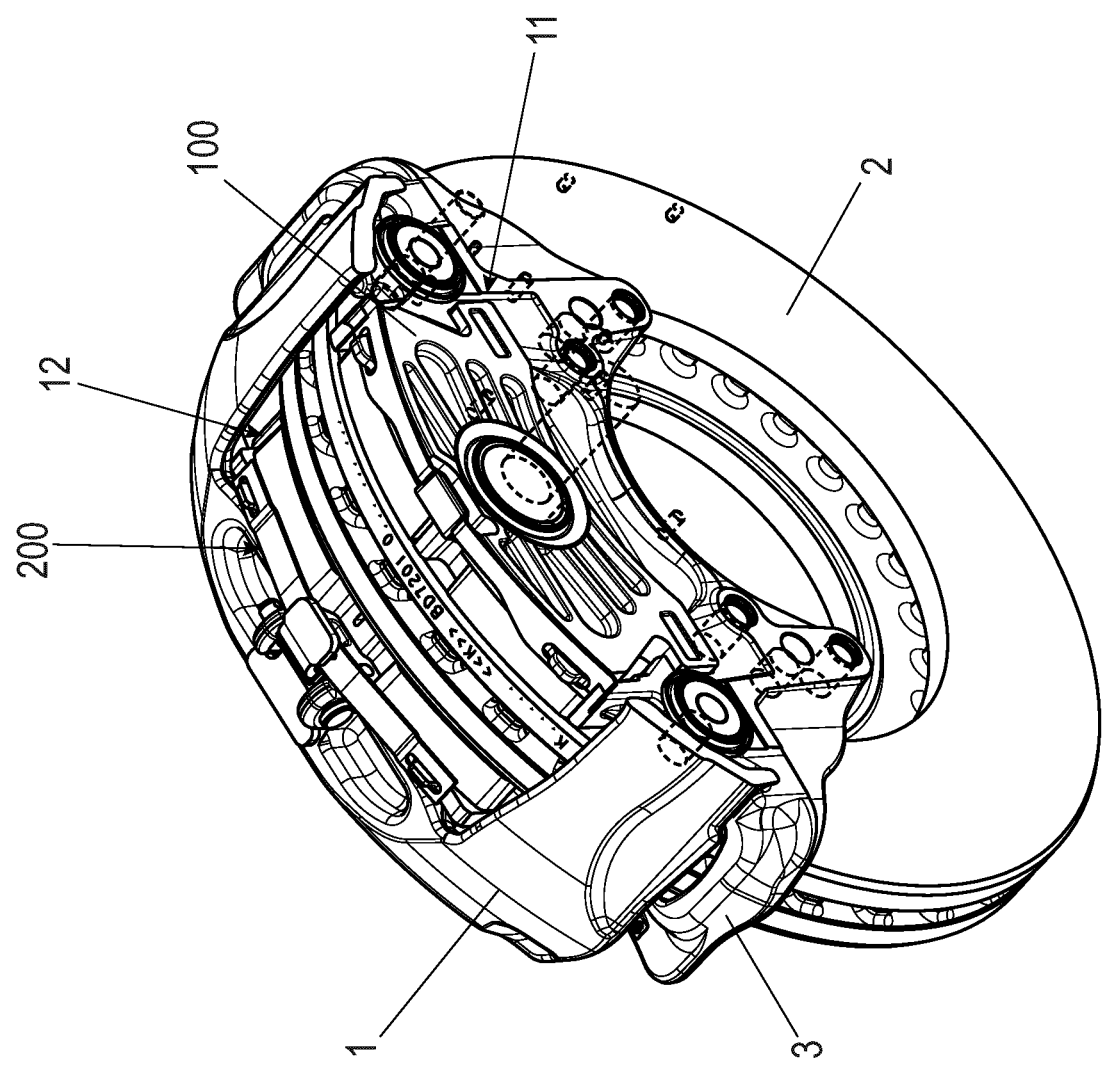
FIG. 2 the view from FIG. 1A with brake caliper partially omitted.

FIGS. 1A and 2 and also 9 and 10 show in each case a disc brake for a utility vehicle. The disc brake has a brake caliper 1 which engages over a brake disc 2. Not illustrated is an associated electric or pneumatic actuator (for example a brake cylinder). The brake disc 2 has a brake disc axis of rotation D. The brake caliper 1 is arranged on a brake carrier 3. Here, the brake caliper 1 is, in a preferred refinement, arranged on the brake carrier 3 so as to be displaceable axially in relation to the brake disc 2 in the direction of the brake disc axis of rotation D (to which expressions such as "axial" and "radial" relate here). For this purpose, the brake caliper 1 is mounted on guide beams 4 (not visible here in detail) which are connected to the brake carrier 3 held positionally fixedly on the vehicle.

The brake caliper 1 comprises an application section 1a, a caliper rear section 1b and two tension struts 1c. The application section 1a accommodates an application device (not shown) of the disc brake 1.

The application section 1a runs with a side parallel to the plane of the brake disc 2 on one side of the brake disc 2. The caliper rear section 1b is arranged, likewise so as to run parallel to the brake disc 2, on the other side of the brake disc 2. The caliper rear section 1b is connected to the application section 1a at in each case one end by means of in each case one tension strut 1c. The tension struts 1c run in this case substantially at right angles to the application section 1a and to the caliper rear section 1b.

In this arrangement, the application section 1a, the caliper rear section 1b and the tension struts 1c define a central opening 1d between them, which opening spans the brake disc 2. The opening 1d has an imaginary longitudinal central line which lies in the plane of the brake disc 2 and which connects the imaginary centers of the tension struts 1c. Furthermore, the opening 1d has a further imaginary transverse central line which connects an imaginary center of the application section 1a to an imaginary center of the caliper rear section 1b.

Figure 9:
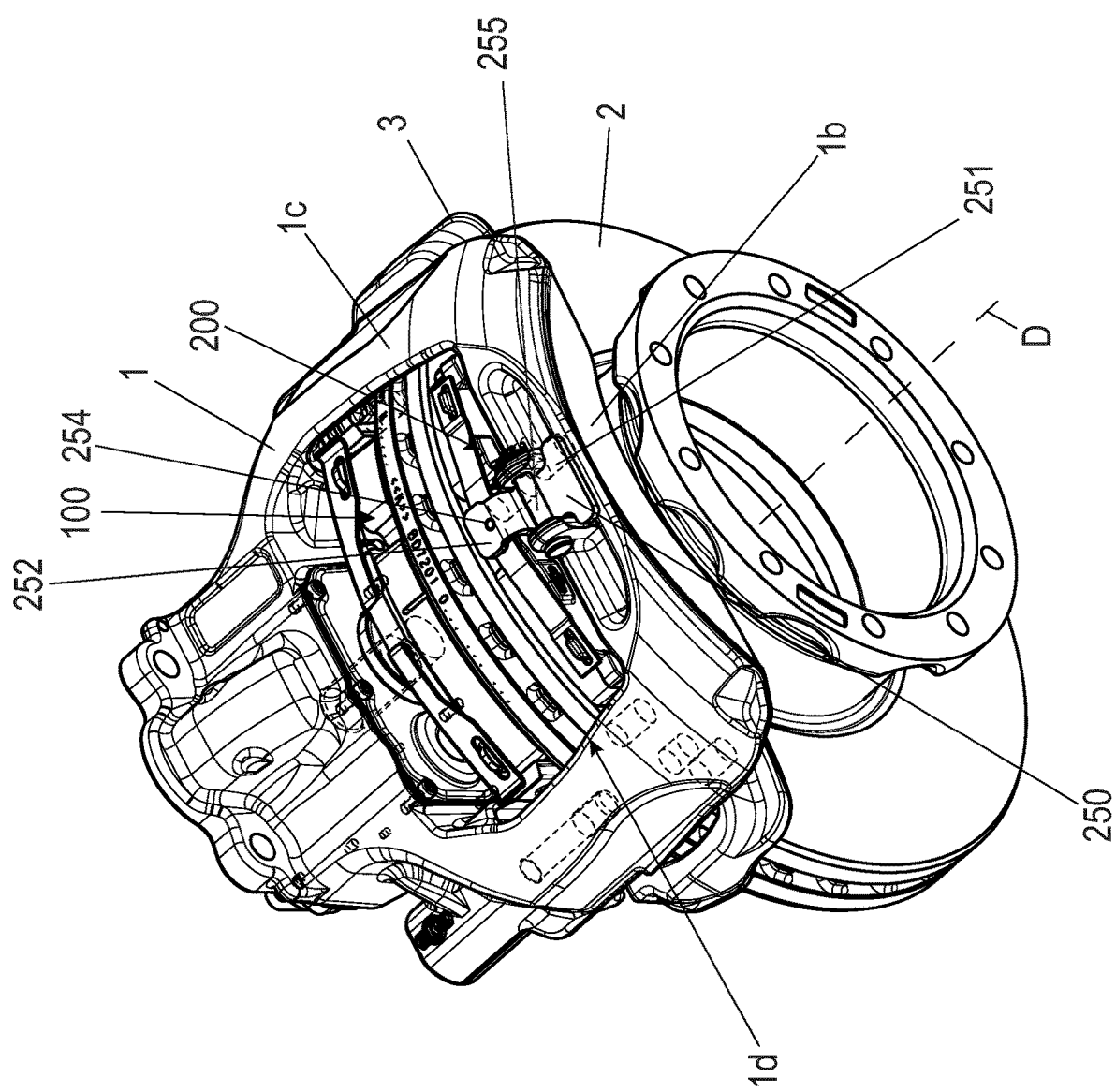
FIG. 9 shows a perspective view of a second disc brake according to the invention.
Figure 10:
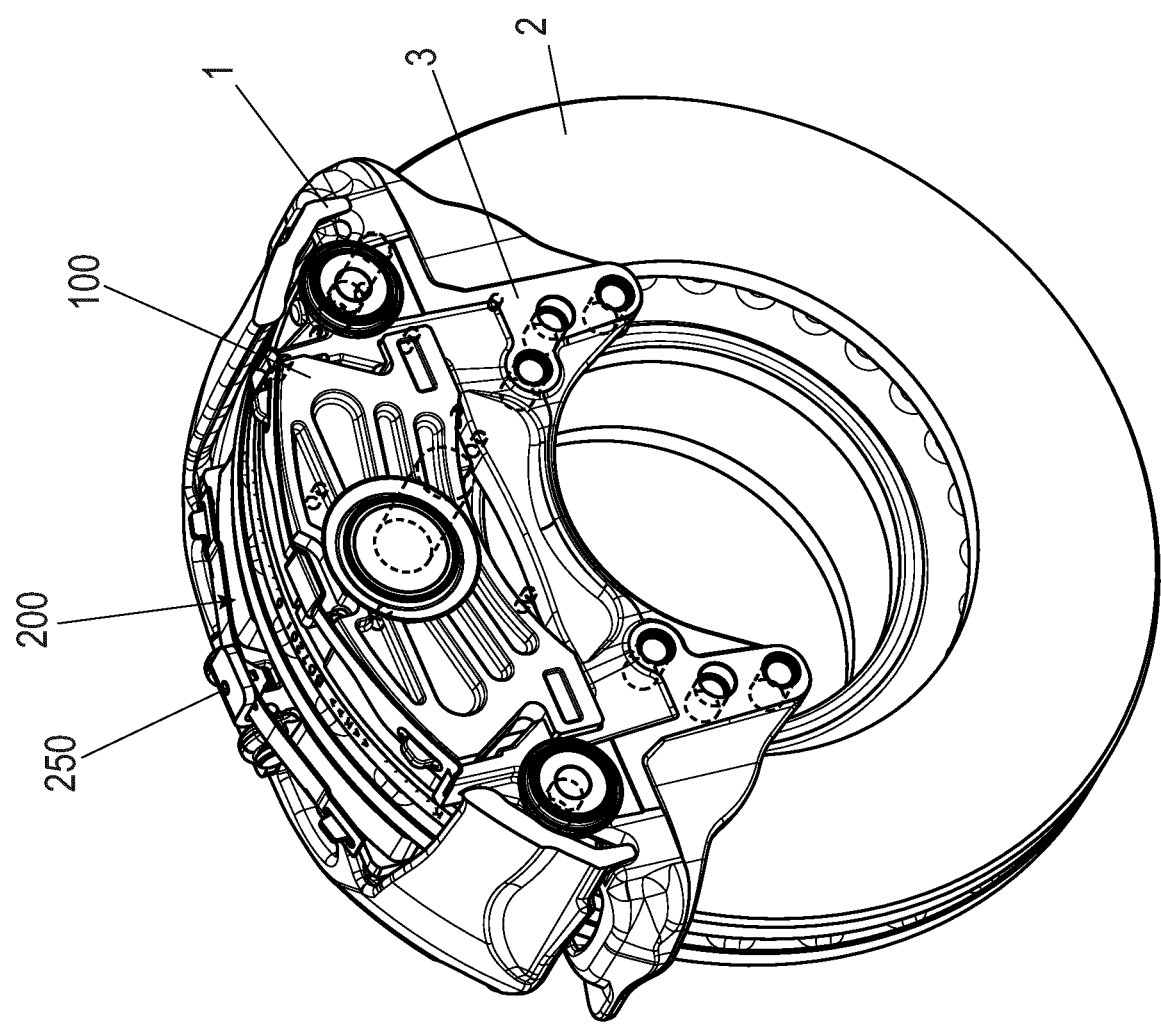
FIG. 10 shows the view from FIG. 9 with brake caliper partially omitted.

To both sides of the brake disc 2, there is provided in each case one brake pad 100, 200 (not illustrated in FIG. 9). One brake pad 100—hereinafter also referred to as application-side brake pad 100—is arranged on the side of an application device. The further brake pad 200—hereinafter also referred to as reaction-side brake pad 200—is arranged on that side of the brake disc 2 which is situated opposite the application side.

The central caliper opening 1d over the brake disc is designed or dimensioned such that the two brake pads can be inserted through the caliper opening into the brake carrier, which permits a simple pad change.

A braking operation is performed by means of the application device arranged in the application section 1a of the brake caliper 1, in a receiving space therein, said application device having a brake lever which is positioned in a dome, or in the application section 1a, of the brake caliper 1. The application device is actuated by an actuator (not illustrated). Said application device is preferably pneumatically actuated, or electromechanically. For this purpose, it is preferably equipped with a brake cylinder, which may be arranged on the brake caliper of the disc brake (not illustrated here).

The two brake pads 100, 200 can be pressed against the brake disc 2 at both sides during braking operations. In the case of an embodiment as a sliding caliper brake, during a braking operation, the application-side brake pad 100 makes contact with the brake disc 2. During the further course of the braking operation, reaction forces that arise cause the brake caliper 1 to be displaced in the opposite direction, driving the reaction-side brake pad 200 along until it likewise comes into frictional contact with the brake disc 2.

Each of the brake pads 100, 200—see FIGS. 3, 4 and 11 and 16—has in each case one pad carrier 110, 210 and one friction pad 120, 220 fastened thereto on the side facing toward the brake disc 2, which friction pad is, in its function, that is to say during a braking operation, pressed against the brake disc 2.

The brake pads 100, 200 are accessible through the central opening 1*d* for an exchange and for maintenance. They can be inserted "from above" radially through said central opening 1*d* into associated pad slots and removed from the latter again. The expressions "above" and "below" will be used in this sense below.

Figure 1B:
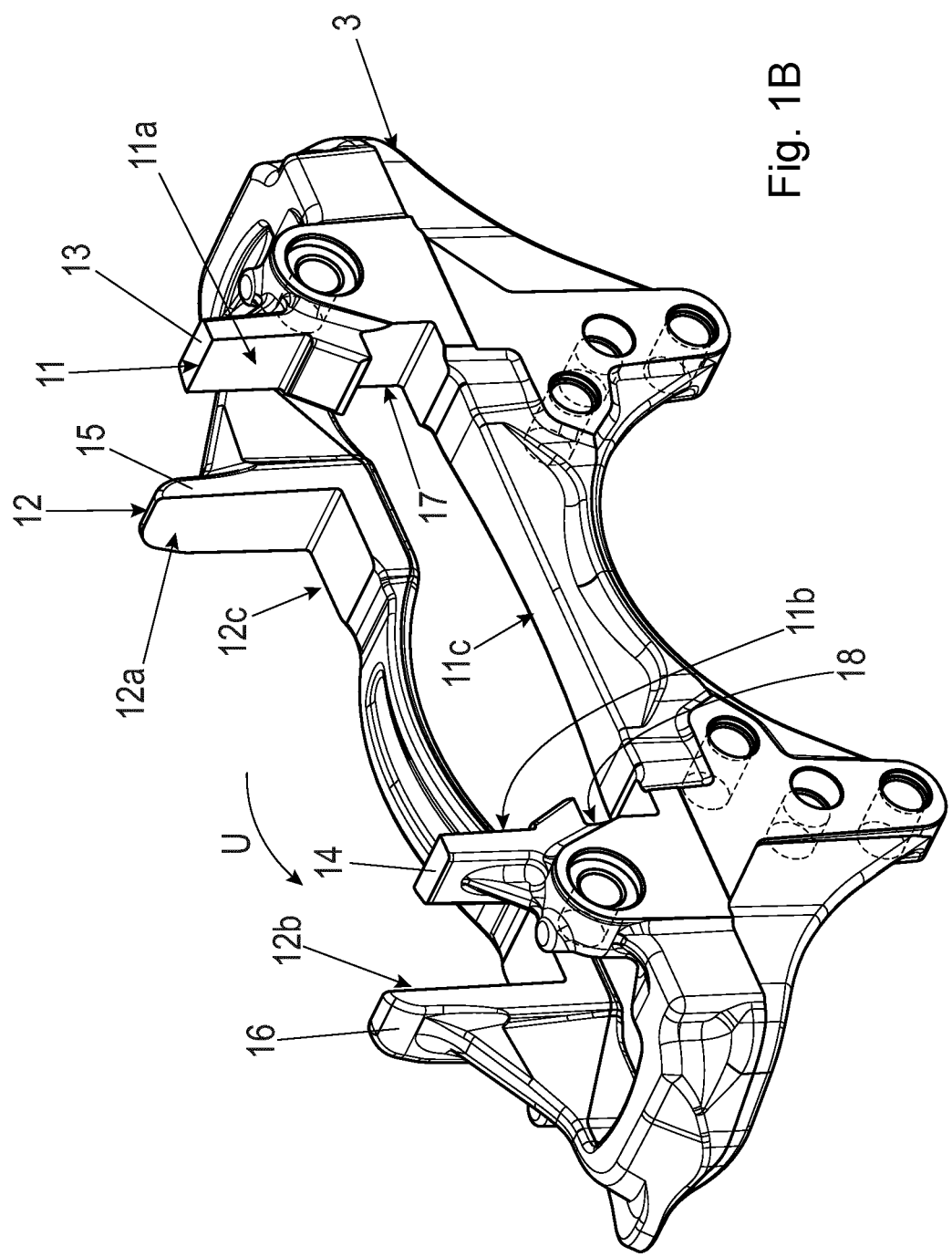

An application-side pad slot 11 for the application-side brake pad 100 is formed in the brake carrier 3 on the side of the application device or in an application-side section of the brake carrier. This can be seen in FIG. 1*b*.

Provision is made by the brake carrier 3 engages in the manner of a frame around an upper edge region of the brake disc 2 and has an application-side section and a reaction-side section. Then, a second pad slot 12 for the reaction-side brake pad is preferably also formed in the brake carrier 6 (on the reaction side, see FIGS. 1A and 1B). The reaction-side pad slot 12 for the reaction-side brake pad 100 may however alternatively also be formed in the brake caliper 1 (if the brake carrier has only an application-side section and no reaction-side section; not illustrated here).

The pad slots 11, 12 are (see FIGS. 1A and 1B) delimited in each case laterally (or in the direction of rotation U and counter to the direction of rotation U) by support surfaces 11*a*, 11*b*; 12*a*, 12*b* on brake carrier horns 13, 14 and 15, 16 respectively, and have in each case a pad slot base 11*c*, 12*c* which is formed between the brake carrier horns 13 and 14 or 15 and 16 respectively.

The application-side brake pad 100 and the reaction-side brake pad 200 are in this case of different design. Here, the application-side brake pad 100 may in turn be designed in a variety of ways. The illustration selected in FIGS. 2 and 3 is thus particularly advantageous but not imperative.

Figure 3:
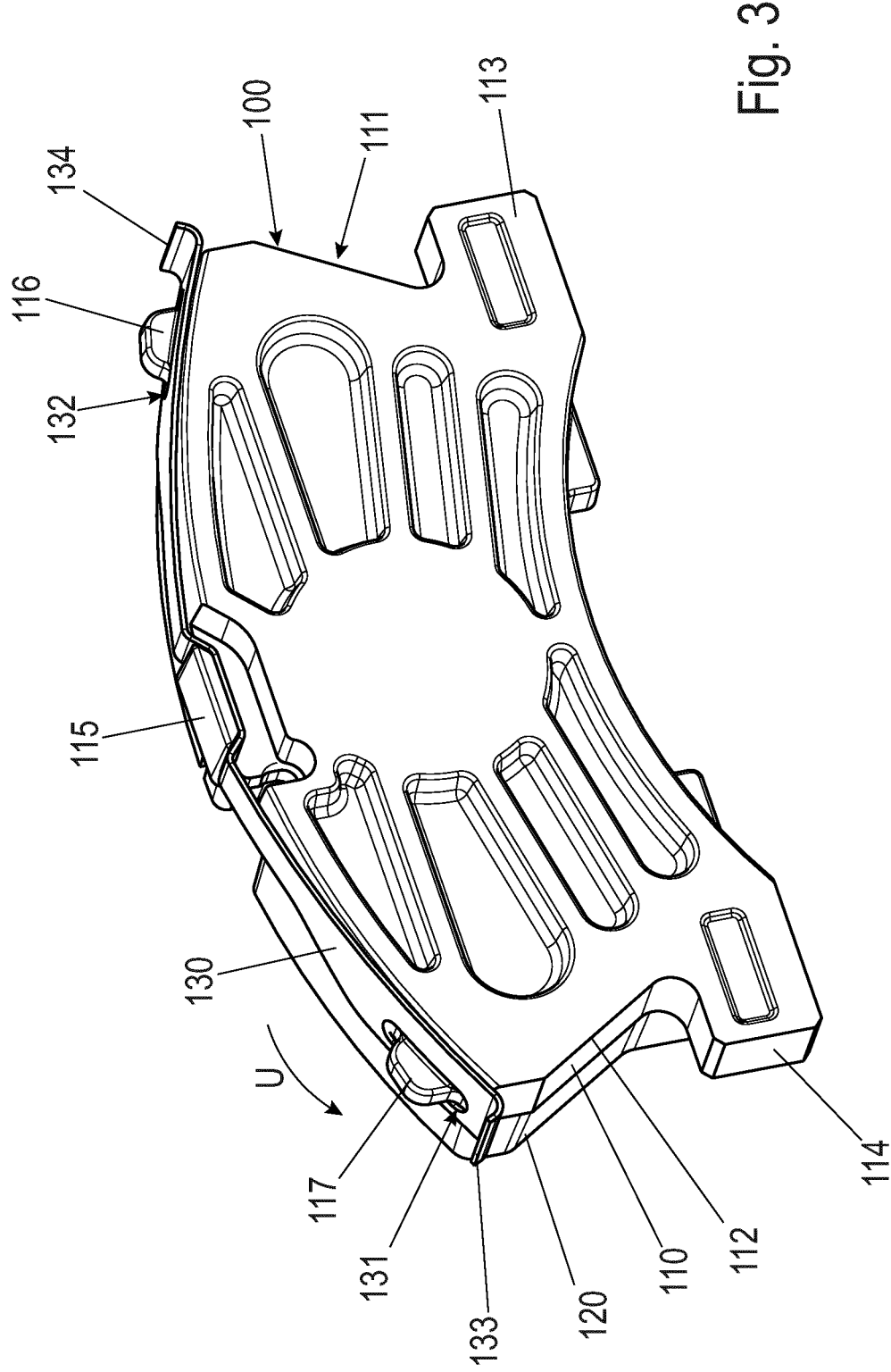
FIG. 3 shows a perspective view of an application-side brake pad of the disc brake from FIGS. 1A and 1B (and of the disc brake from FIG. 9).

The application-side brake pad 100 of FIGS. 2 and 3 (suitable for the brake of FIG. 1 and of FIG. 9) has the pad carrier 110 and the pad material 120 arranged thereon on one side, which pad material is directed, in the installed state, toward the brake disc 2. The pad carrier 110 has, in turn, two side edges 111, 112 which lie parallel to the associated support surfaces of the brake carrier horns 13, 14. In relation to the preferred direction of rotation U (corresponding to forward travel), one side edge 111 is configured as an exit side, and thus serves as a support surface during braking operations from the forward travel direction. In relation to the preferred direction of rotation U (corresponding to forward travel), the further side edge 112 is configured as an entry side. It thus serves as a support surface during braking operations from the reverse travel direction.

At the side edges 111, 112—in this case at the lower edges thereof in the pad slot 11—in each case at least one projection 113, 114 projects outward in mutually opposite directions. Each of said projections 113, 114 engages in each case into an associated undercut 17, 18 of the brake carrier 3 (see FIG. 1B), which undercuts are formed in each case in the brake carrier horns 13, 14 of the application-side pad slot 11. In this way, the installed application-side brake pad 100 is radially secured in the brake carrier 3 and is also secured against turning out during braking operations. The projections furthermore serve as further support regions during braking operations. During exchange, the new brake pad 100 is inserted radially and then displaced axially such that the projections 113 and 114 engage into the undercuts 17, 18.

The application-side brake pad 100 may furthermore have a pad spring 130. Said pad spring engages here centrally under a holding clip 115 which is formed in one piece on the or with the pad carrier 110. The pad spring 130 is thus radially secured. The pad spring 130 furthermore has, to both sides of the holding clip, in each case one slot 131, 132 which is extended through by lugs/projections 116, 117 on the top side of the pad carrier 110. The pad spring 130 is thus secured axially and against turning out. Ends 133, 134 of the pad spring 130 preferably lie resiliently on the brake carrier horns 13, 14. By means of the spring preload, the application-side brake pad 100 is thus pulled upward in its pad slot 12 in the brake carrier 3.

In this way, the application-side brake pad 100 is in particular radially secured and held in the brake carrier 3 in an effective manner. Said application-side brake pad therefore does not require a hold-down clip fixed to the brake caliper.

Figure 4:
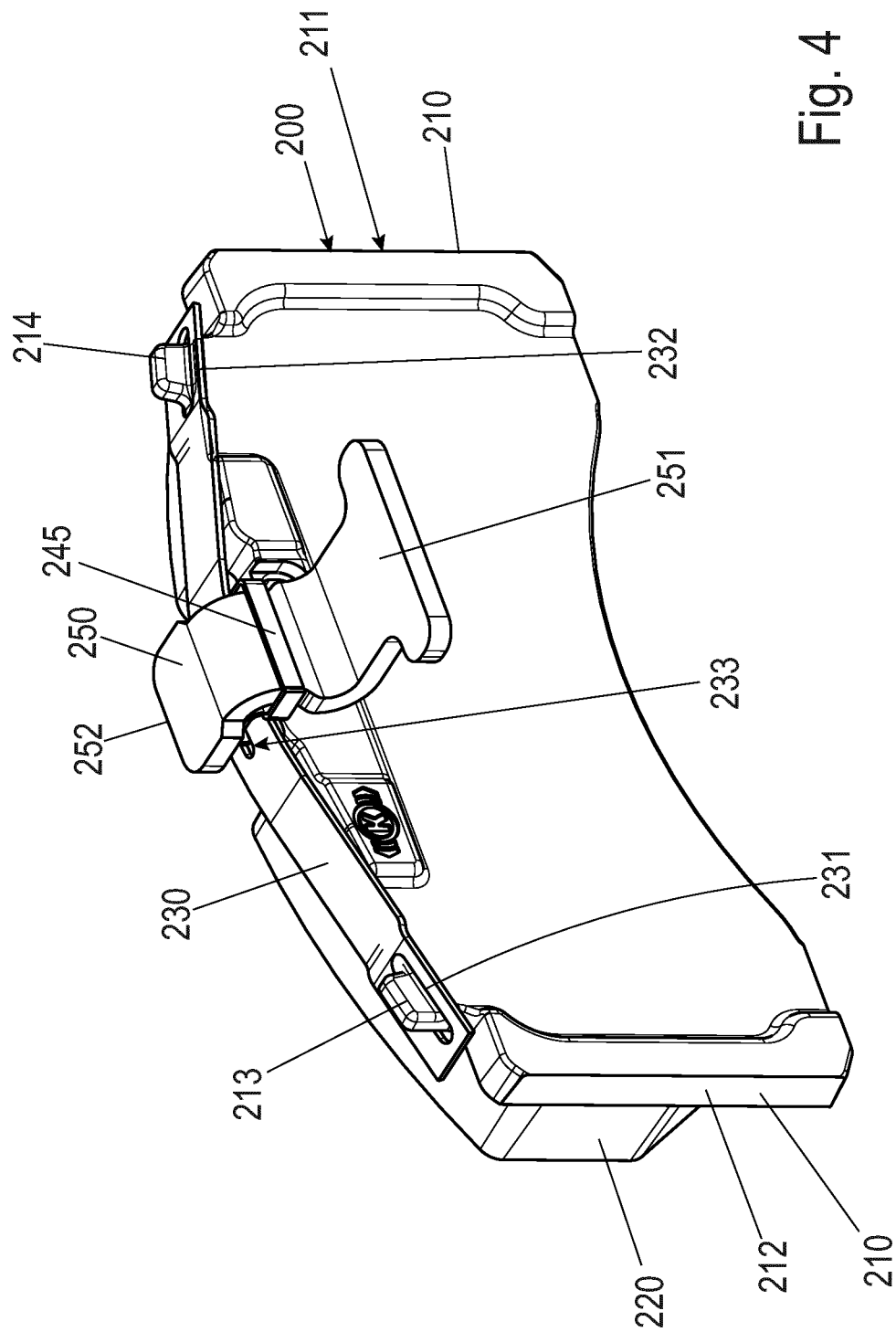
FIG. 4 shows a first reaction-side brake pad with a pad spring, a cover and a hold-down clip arranged thereon.
Figure 11:
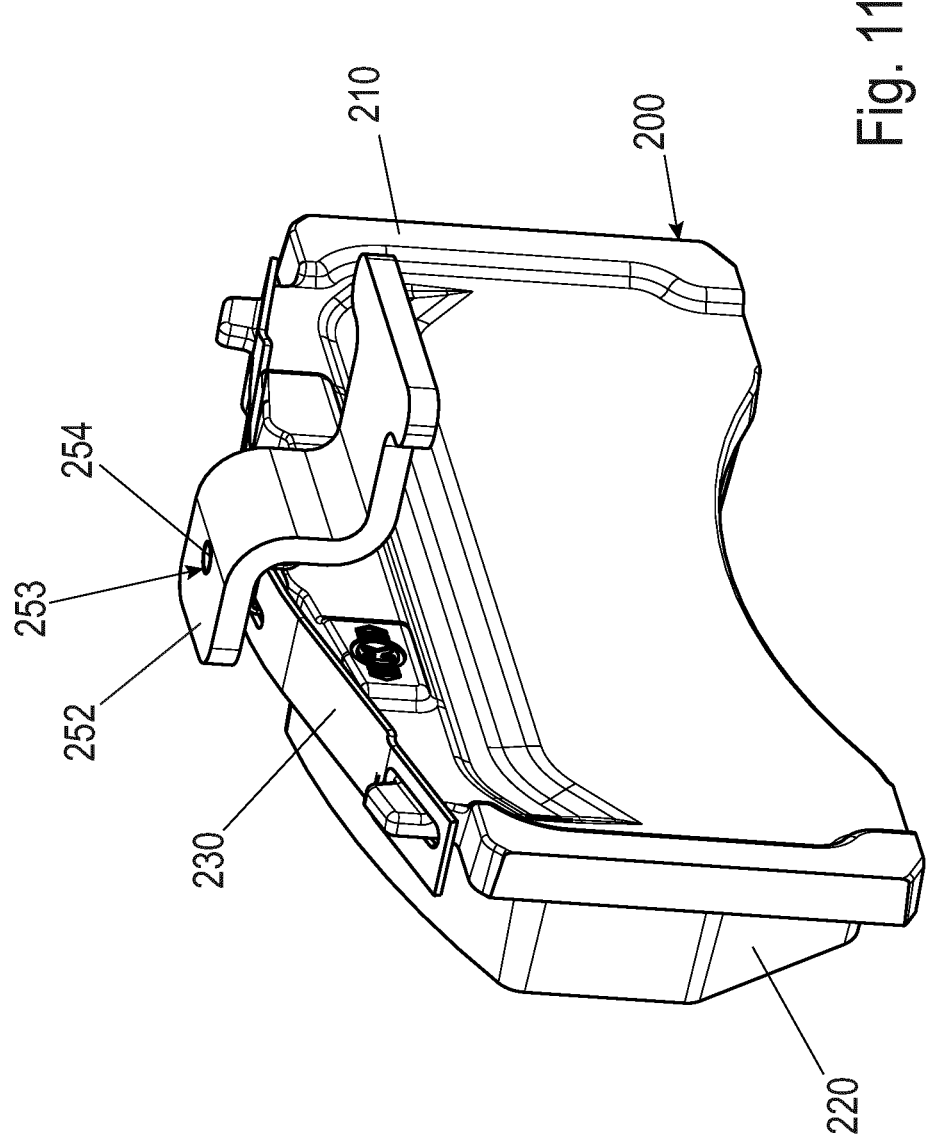
FIG. 11 shows a variant of a reaction-side brake pad with a hold-down clip arranged thereon.
Figure 12:
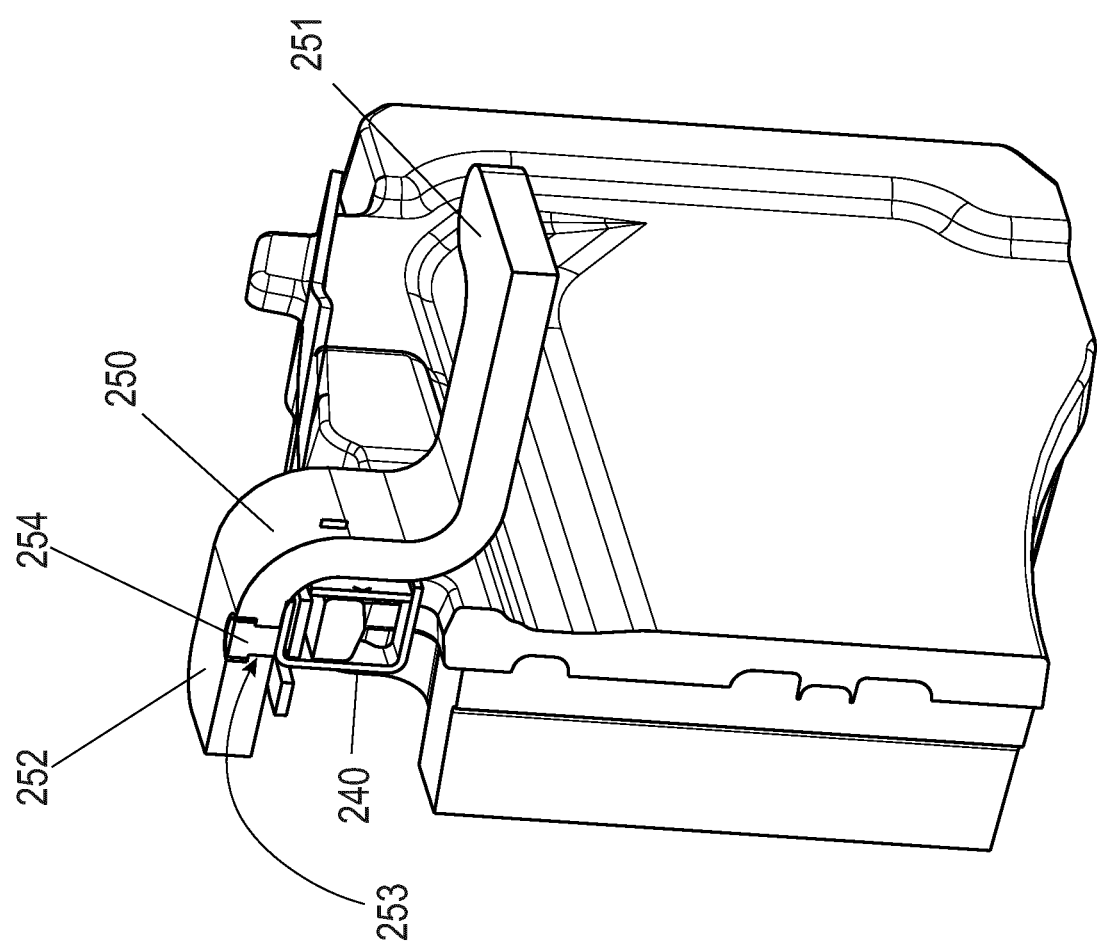
FIG. 12 shows a partially sectional view of the arrangement from FIG. 11.

The reaction-side brake pad 200 of FIG. 4 or FIG. 11 has, in turn, a pad carrier 210 and the pad material 220 arranged thereon on one side, which pad material is, in the installed state, directed toward the brake disc 2.

The pad carrier 210 has, in turn, two side edges 211, 212, which in this case are oriented parallel and additionally lie parallel to the associated support surfaces 12*a, b* of the brake carrier horns 15, 16 of the reaction-side pad slot 12 of the brake carrier 3 (FIG. 1*a*).

In relation to the preferred direction of rotation U (corresponding to forward travel), one side edge 211 is in turn configured as an exit side and thus serves as a support surface during braking operations from the forward travel direction. In relation to the preferred direction of rotation U (corresponding to forward travel), the further side edge 212 is in turn configured as an entry side. It thus serves primarily as a support surface during braking operations from the reverse travel direction.

The reaction-side brake pad 200 has—see FIGS. 4 and 5 and 12, 13 and 15—a pad spring 230. At the upper longitudinal edge of the pad carrier 210, the pad-holding spring 230 is preferably non-detachably fastened to, or arranged/held on, a cover 240—FIGS. 5, 6, 8 and 12, 13 and 15. The cover 240 is preferably deflectable on the pad carrier 210 to a limited extent.

Here, at the side edges 211, 212—in this case at the lower edges thereof in the pad slot 12—of the pad carrier 210, there is in each case no projection projecting outward in mutually averted directions. This brake pad is therefore not radially secured. It therefore requires another device for radial securing in the pad slot. To secure the reaction-side brake pad 200 radially in its pad slot 12, a hold-down clip 250 is (thus) provided. Said hold-down clip may be configured in one or more pieces.

The hold-down clip 250 is fixed at one end 251 thereof to the brake caliper 1, such that said hold-down clip is not released from said brake caliper during braking operations.

By contrast, for a pad change, said hold-down clip can be released from the brake caliper 1.

The hold-down clip 250 is designed and dimensioned so as to hold down only one of the two brake pads 100, 200. Here, this is the reaction-side brake pad 220, which it holds down, but not the application-side brake pad 100, which it does not radially secure or hold down.

The hold-down clip 20 is preferably a generally flat component perpendicular to its axial direction. This is advantageous but not imperative. This however yields a space-saving design. The cross section of the hold-down clip 250 may preferably be rectangular, with two parallel narrow sides and two parallel long sides.

In this way, said hold-down clip 250 interacts with the brake pad 220. The brake pad 220 is designed to be held down by said hold-down clip 250 directly or via one or more interposed elements. Said brake pad extends from the brake caliper rear section 1b, parallel to the brake disc axis, into the caliper opening 1d, into which it projects but which it does not fully bridge. That end 252 of said brake pad which is averted from the brake caliper 1 engages over the pad carrier 210 of the reaction-side brake pad 200. Said end 252 however preferably does not also engage over the brake disc 2, and furthermore preferably does not also engage over the application-side brake pad 100 (see FIGS. 1 and 9).

Furthermore, it is also the case that the caliper opening 1d is not fully engaged over in the axial direction (parallel to the brake disc). Therefore, said hold-down clip 250 is structurally simple and nevertheless very reliable. It only needs to be fastened to one edge of the opening 1d on the brake caliper 1, preferably to the caliper rear section 1b.

That end 252 of the hold-down clip 250 which is averted from the brake caliper 1 preferably engages over at least the pad carrier 210 of the reaction-side brake pad 200. It furthermore preferably also engages over the cover 240 axially proceeding from the brake caliper 1, which cover is extended through by the pad spring 230 or by a part of the pad spring 230.

In one variant, it is advantageous if the hold-down clip 250 merely axially engages over the reaction-side brake pad 200 and thus radially secures the latter, but is not fastened to the brake caliper 200. Thus, good radial securing of the reaction-side brake pad 200 is realized.

By contrast, in a further variant, it is advantageous if the hold-down clip 250 is also fastened to the reaction-side brake pad 200. In this way, an easily handlable mounting unit is formed, which facilitates the pad change.

In one refinement of this variant, it is advantageous if the hold-down clip 250 is non-releasably fastened to the reaction-side brake pad 200.

In this way, firstly, an easily handlable mounting unit is formed, and secondly, it is ensured that, during a pad change, the hold-down clip 250 (which has been heavily loaded as a result of numerous braking operations) is also reliably jointly exchanged.

For the release, only the fixing of the hold-down clip 250 to the brake caliper 1 is released. Then, the reaction-side brake pad 200 together with the hold-down clip 250 is exchanged as a structural unit. Preferably, said structural unit advantageously also comprises the pad spring 230. Said structural unit furthermore preferably also advantageously comprises the cover 240.

The fastening of the hold-down clip 250 to the reaction-side brake pad 220 may be realized in a variety of ways, for example by means of a form-fitting or cohesive connection to a part of the reaction-side brake pad 220. In one variant—see FIG. 16—the pad carrier 210 is expedient as said part, or the pad spring 230 is expedient as said part (neither case is illustrated). Also, if present, the cover 240 is expedient as said part. This advantageous variant has been realized in the drawings of FIGS. 1 to 15.

The hold-down clip 250 may be cohesively connected to the cover 240, for example directly or indirectly (via an intermediate part such as a bolt) welded or brazed to said cover. The hold-down clip 250 may also be screwed to the cover 240 or fastened to the cover 240 by means of a rivet (not illustrated).

It is alternatively also advantageous for the cover 240 to have an integrally formed part such as an arm or multiple arms or even a circumferentially closed ring 245 (FIG. 6), which is preferably formed in one piece with said cover and by means of which the hold-down clip 250 is non-detachably attached to the cover 240. The ring 245 is preferably extended through by the hold-down clip 250 (FIG. 4). Additionally, the hold-down clip 250 may be cohesively fixed, for example by welding, to the ring 245.

In a side view (see for example FIG. 4), the hold-down clip 250 may be of stepped form. This serves inter alia for compensating a height offset in relation to the brake caliper 1. This Z shape may furthermore also be utilized for simple and uncomplicated fixing of the hold-down clip 250 to the brake caliper 1.

The one end of the hold-down clip 250, which is fastened to the brake caliper 1, may be fixed there in a variety of ways. It is advantageous for said end to be fixed in form-fitting fashion to the brake caliper 1 by means of a pin 255 (FIG. 1A, FIG. 9). For this purpose, the pin 255 extends through openings 1e, which in this case are bores, in two spaced-apart lugs if on the brake caliper 1, and engages over the hold-down clip 250, the end 251 of which lies on the brake caliper 1 between the lugs 1f. A T-shaped design of the end 251 here ensures that the hold-down clip 250 cannot slip in an axial direction through the lugs 1f.

At the two ends of the pad-holding spring 230—see again FIG. 4—there are provided slots 231, 232 which are extended through by lugs or projections 213, 214 formed integrally on the pad carrier 210 at the top side of the pad carrier 210.

For the preferably non-releasable connection of the pad-holding spring 230 to the pad carrier 210, the cover 240 is provided, which, as can be seen in particular in FIG. 4 and also FIG. 15, preferably has a cross section which is approximately rectangular in cross section, with two parallel limbs 241, 242 which are connected to one another by a web 243 above the pad carrier 210 and a further web 244 (which extends through an opening of the pad carrier 210).

Approximately centrally between the slots 231, 232, a longitudinal slot 233 is formed into the pad-holding spring 3, through which longitudinal slot is inserted one of the limbs 242 of the cover 240, which, like the opposite limb 241, lies or approximately lies against an associated wide side of the pad carrier 210.

Figure 5:
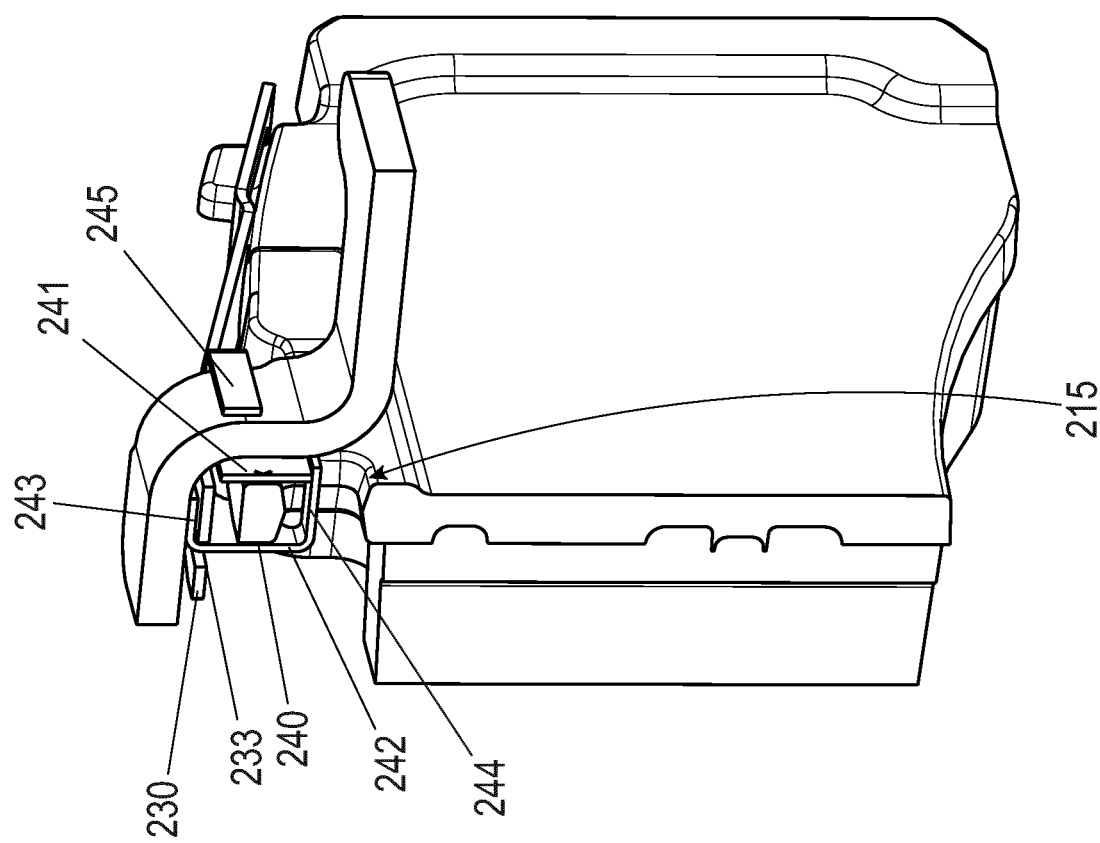
FIG. 5 shows a partially sectional view of the arrangement from FIG. 4.
Figure 6:
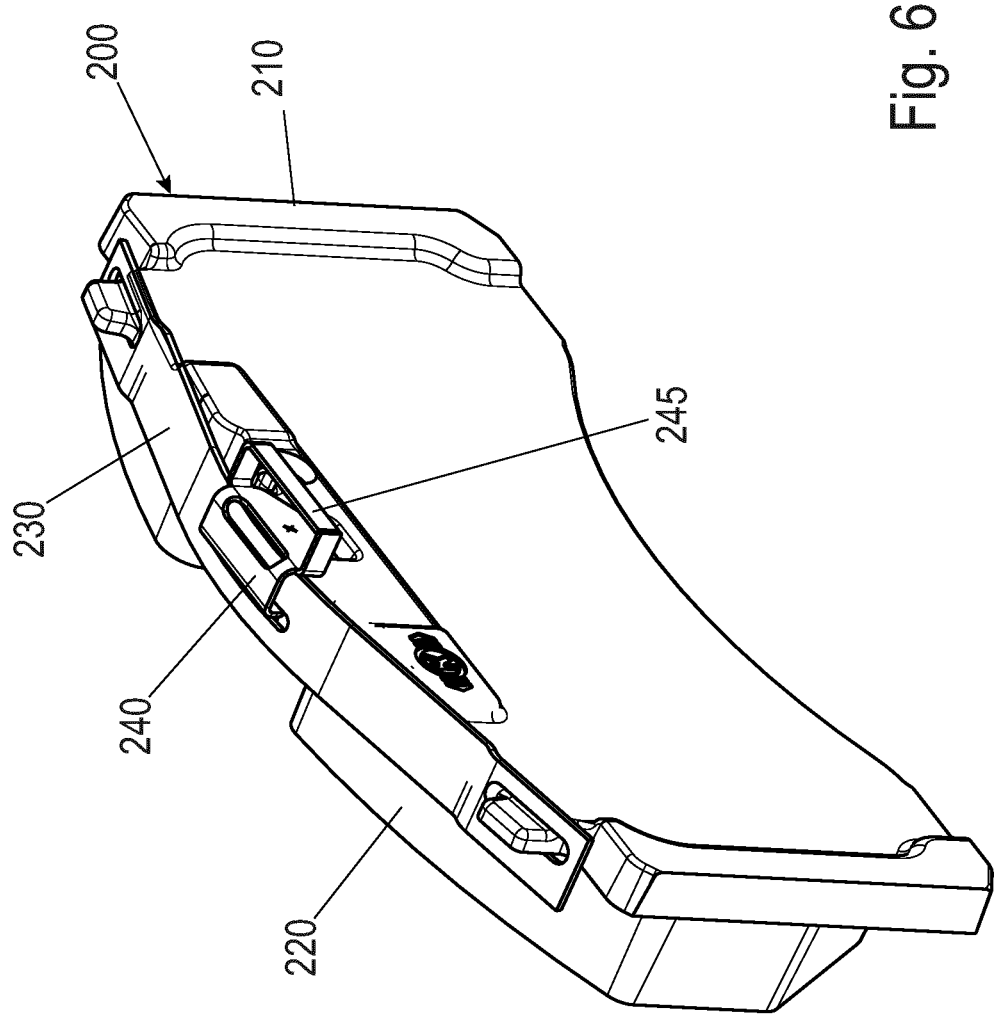
FIG. 6 shows the brake pad of the arrangement from FIGS. 4 and 5.
Figure 7:
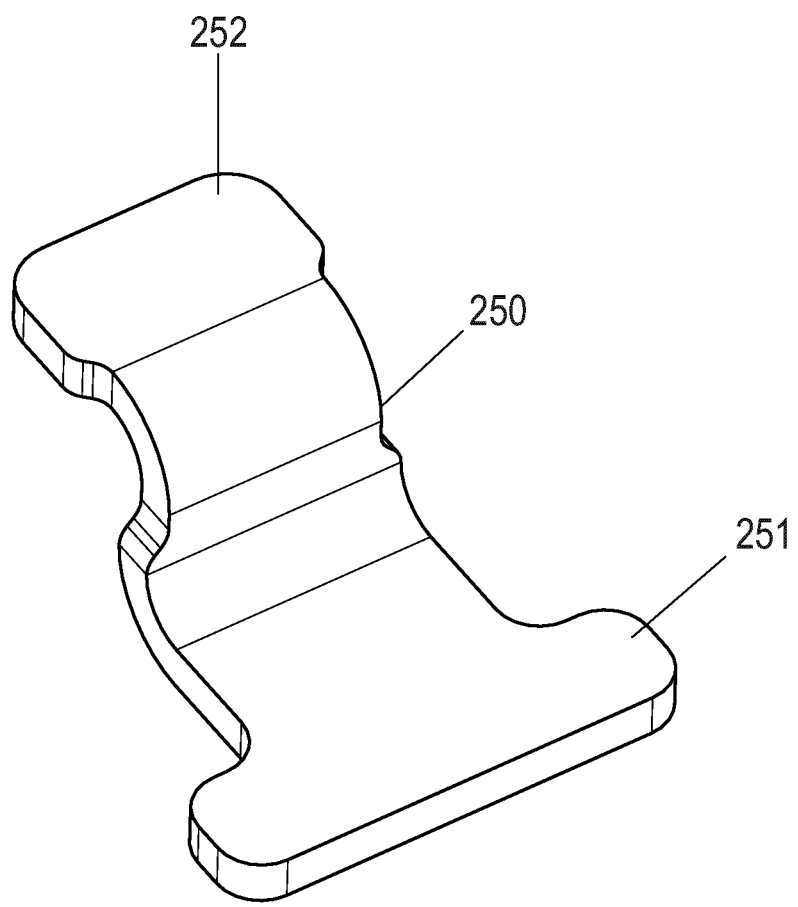
FIG. 7 shows the hold-down clip of the arrangement from FIG. 4.
Figure 8:
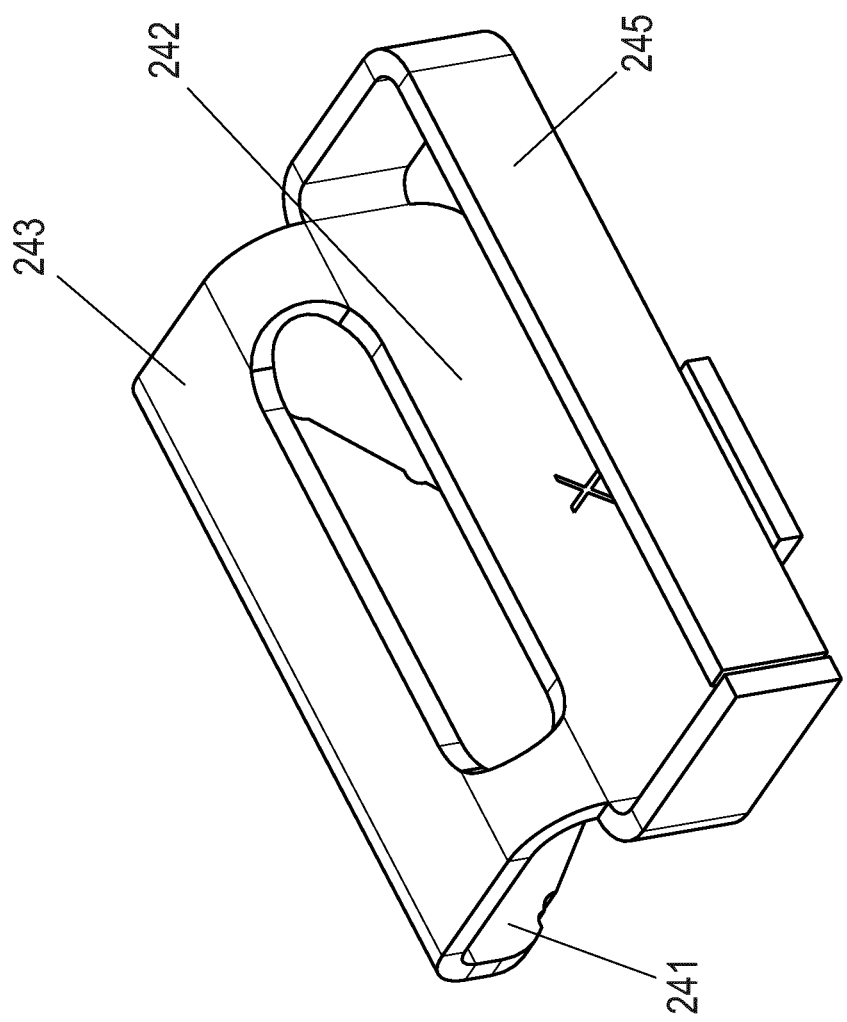
FIG. 8 shows a cover of the arrangement from FIG. 4.

As can furthermore be clearly seen in FIG. 5, the pad-holding spring 230 is preferably wider or thicker than the axial thickness of the pad carrier 210, such that the pad-holding spring 230 protrudes in the direction of the friction pad 220, whereas its other longitudinal edge is approximately aligned with the rear side of the pad carrier 210. It can also be seen in FIG. 5 that the limbs 241 are adjoined, at the bottom, by the connecting web 244, which runs parallel to the web 243.

A non-destructive release of the cover 240 is ruled out by means of a preferably cohesive connection, whereby a secure fastening of the pad-holding spring 230 is ensured.

For this purpose, the cover 240 may also be cohesively fastened to the pad-holding spring 230 or to the pad carrier 210.

The limbs 241, 242 are otherwise in terms of their outline in this case of preferably trapezoidal design, wherein the wide side is formed by the web 243, whereas the connecting web 244, which in this case extends through the passage hole 215 in the pad carrier 210 in a displaceable manner, defines the relatively narrow side. As already stated, in relation to the longitudinal extent of the pad-holding spring 230, the longitudinal slot 233 is preferably arranged approximately centrally. Said longitudinal slot is very particularly preferably arranged exactly centrally (see also, with regard to the background, the patents EP 1 963 702 B1 and EP 2 255 101 B1).

The cover 240 is preferably radially deflectable to a limited extent on the pad carrier 210. For this purpose, the cover 240 extends with the web 244 through the passage hole 215.

Since the reaction-side brake pad 220 does not change its position in the brake caliper 1 even with increasing wear, it is possible for the hold-down clip 250 to be formed directly as a structural unit with the reaction-side brake pad 200. The cover 240 is particularly expedient for this purpose, which cover thus takes on a further, hitherto unknown function— the fixing of the hold-down clip (for example in FIGS. 4, 11 and 5 and 12). In this way, a particularly advantageous reaction-side brake pad 200 is created which has, as a preferably integrated constituent part, a hold-down clip 250 which has a short structural form which is advantageously restricted to the function of holding down said one brake pad. Advantages to be mentioned are also the simple mounting, reduced production costs, relatively low loads and assurance of correct installation.

The embodiment of the hold-down clip 250 with said brake pad as a structural unit, which is exchanged as a whole during a pad change, is therefore advantageous. This is simple and leads to a renewal of all elements to be exchanged in the "reaction-side pad" structural unit (brake pad, pad spring, if present: cover and hold-down clip).

Whereas it is the case in FIGS. 2 to 8 that the hold-down clip 250 extends through the ring 245 of the cover 240, to which said hold-down clip is preferably also cohesively fixed, provision is made in FIGS. 9 to 15 to utilize a pin (collar bolt, head bolt or the like) 254 for the fastening of the hold-down clip 250 to the cover 240 and thus to the brake pad 200. The pin 250 extends through the hold-down clip in the region of a bore 253 (FIG. 14) radially, and is for example welded or fastened in some other way to the cover 240 (for example by riveting, pressing etc.). The ring 245 may be formed from lugs of the cover 240 and may be of circumferentially closed or non-circumferentially closed form.

The hold-down clip 250 may also be arranged directly on the pad spring 230 or on the pad carrier 210 (the latter variant is illustrated for example in FIG. 16).

Figure 17B:
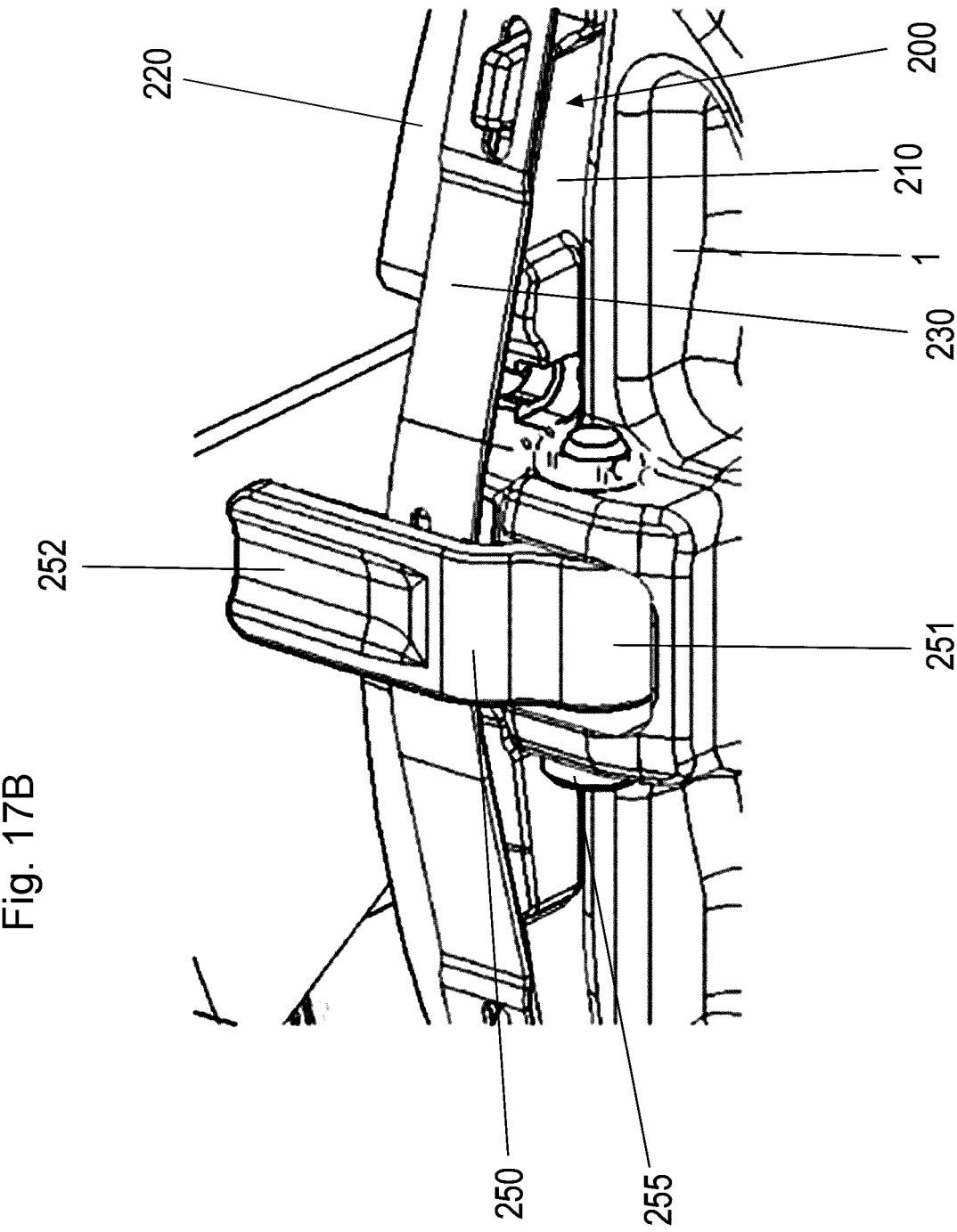
FIG. 17B shows a section through a partial region of the arrangement from FIG. 17A.
Figure 17C:
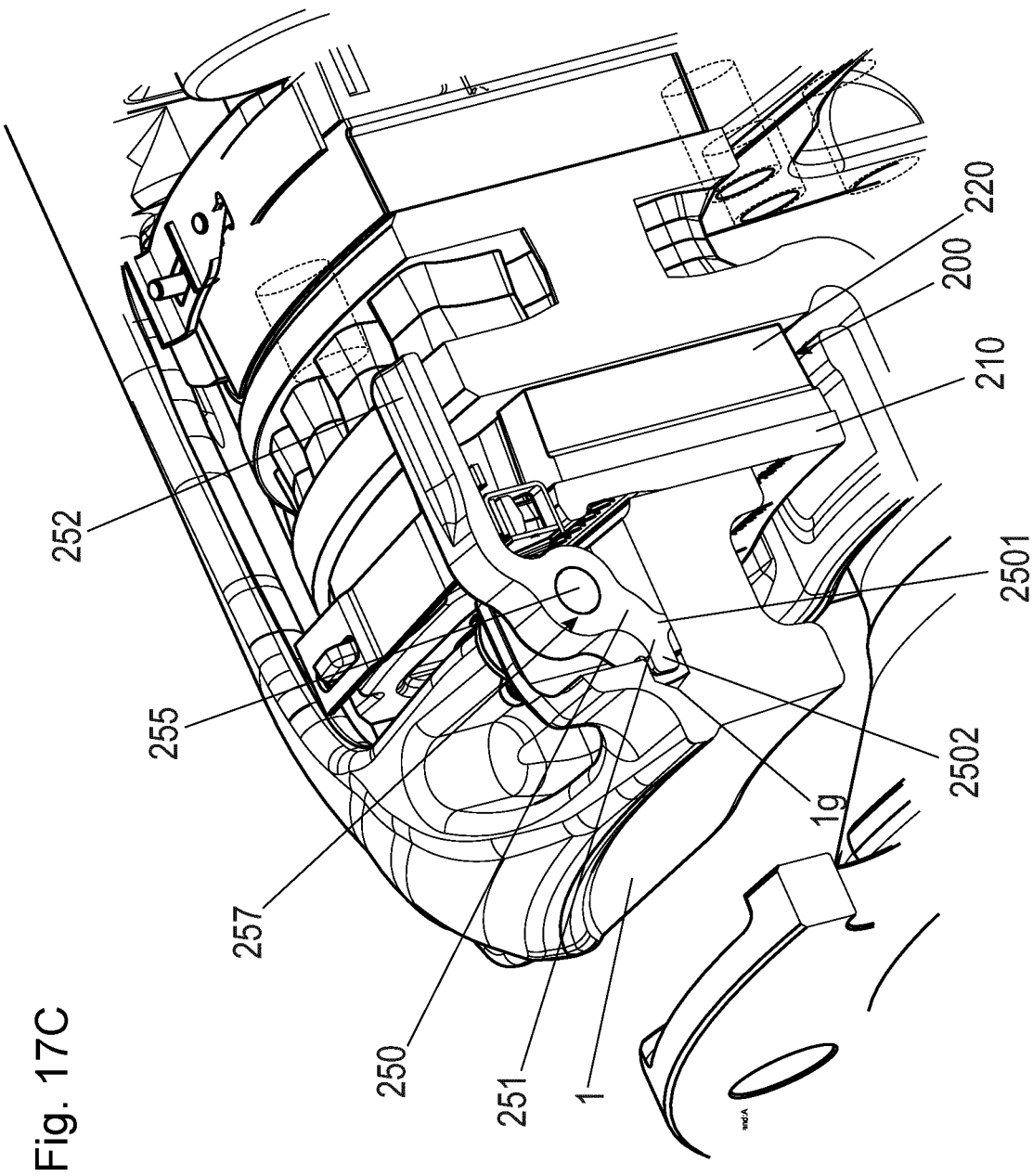
FIG. 17C shows a partially sectional view of a partial region of the arrangement from FIG. 17A; and in FIG. 17D shows a hold-down clip of the arrangement from FIG. 17A in a separate perspective illustration.
Figure 17D:
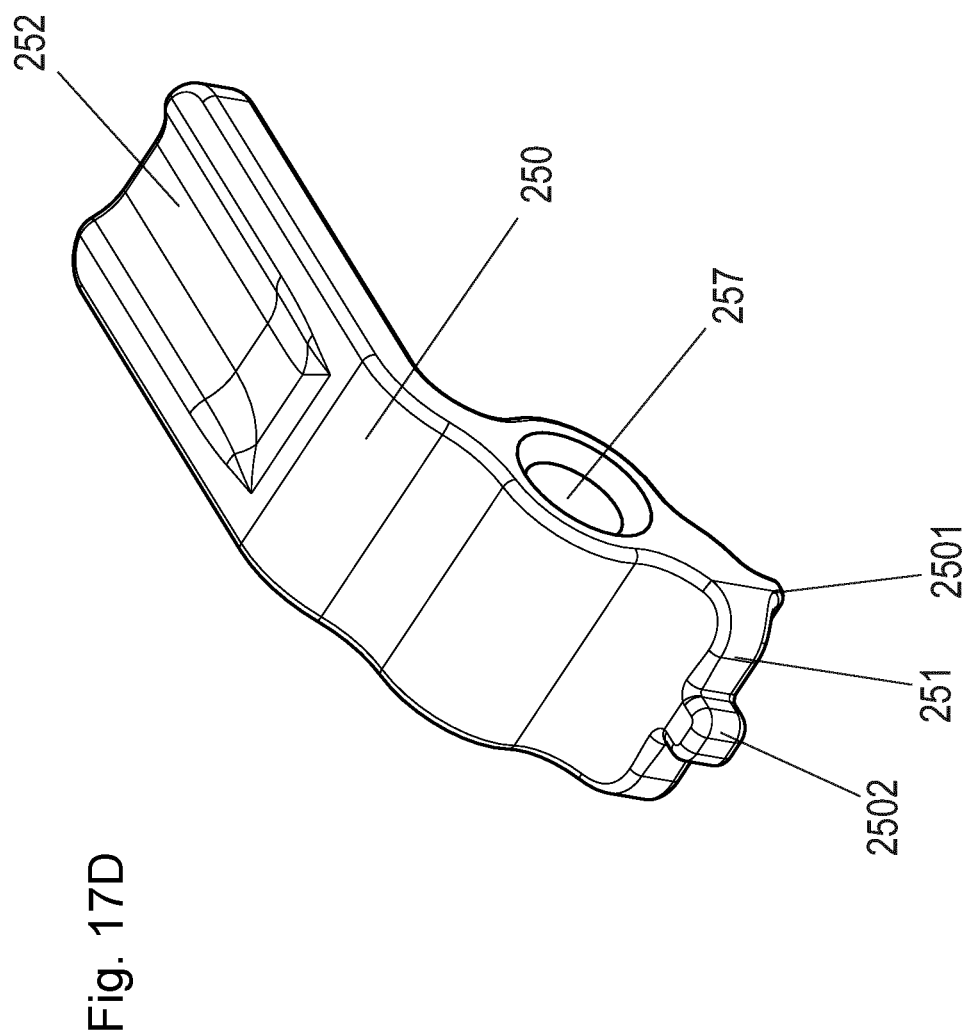
FIG. 17A shows a perspective view of a part of a third further disc brake according to the invention.

In FIG. 16, the pad carrier 210 has an opening 216 into which that end 252 of the hold-down clip 250 which points toward the pad carrier 210 (this also means "a section situated relatively close to the pad carrier 210") engages. The opening 216 may be configured in the manner of a blind hole, or as a passage opening. The other end 251 of the hold-down clip 250 (or a region situated relatively close to the brake caliper 1) may be fixed in form-fitting and/or cohesive fashion (preferably non-releasably) at/in the opening 1d. That end 251 of the hold-down clip 250 which is situated relatively close to the brake caliper 1 points towards the brake caliper 1 and is fixed there in form-fitting and/or cohesive fashion (preferably releasably) in a manner not illustrated here, for example similarly to FIG. 1A or 17. Additionally, a spring 256 may be provided on the hold-down clip 250, which spring can be utilized for resilient support of said brake pad 210 relative to a counterbearing such as the brake caliper 1 (not illustrated here).

The hold-down clip 250 may thus fully or partially extend through the pad back plate or the pad carrier 210. Subsequently, the spring 256 is fastened to the hold-down clip. In this way, the hold-down clip—as already mentioned—is, together with spring 256, captively connected to the reaction-side brake pad 200. The pad-holding spring is thus displaced away, or axially spaced apart, from the brake pad 200. This offers the advantages described in this regard in the introduction.

According to FIGS. 17A, 17B, 17C and 17D, the hold-down clip 250 has a passage opening 257 (for example a bore), preferably parallel to the brake disc 2, in order to hold the one end 251 of the hold-down clip 250 which is fastened to the brake caliper 1 there by means of a/the bolt or pin 255, which in this case runs parallel to the plane of the brake disc 2. For this purpose, the bolt or pin 255 extends through the passage opening 257 and the lugs if on the brake caliper 1. The bolt or pin 255 has, at one end, a head 255a outside the two lugs 1f, and is secured by means of a securing element 260 (in this case a disc and splint) at its other end. A form-fit means such as a projection 258 at the bottom on the pad-holding clip at the other end 252 of the hold-down clip on the pad carrier 210 or on the pad spring 230 interacts in form-fitting fashion with a corresponding form-fit means on the pad carrier 210, such that the brake pad is fixed axially and radially. That end 251 of the hold-down clip 250 which is fastened to the brake caliper 1 furthermore engages axially into a recess 1g of the brake caliper 1, which additionally secures the hold-down clip 250 on the brake caliper.

A contour 2502 (a type of projection) on the end 251 of the hold-down clip 250 on the brake caliper 1 limits the rotation of the hold-down clip 250, which in this case is preferably not connected to the brake pad 200, and ensures that a predefined envelope contour of the brake is maintained. In the stated variants, this is likewise realized by means of the end 251 of the hold-down clip 250 on the brake caliper 1. A further contour 2501 (a projection downward) on the hold-down clip, which further contour is inserted into the recess 1g, facilitates the mounting of the hold-down clip 250, which must be pushed against a pad spring 230 in order to insert the bolt 255.

Figure 18:
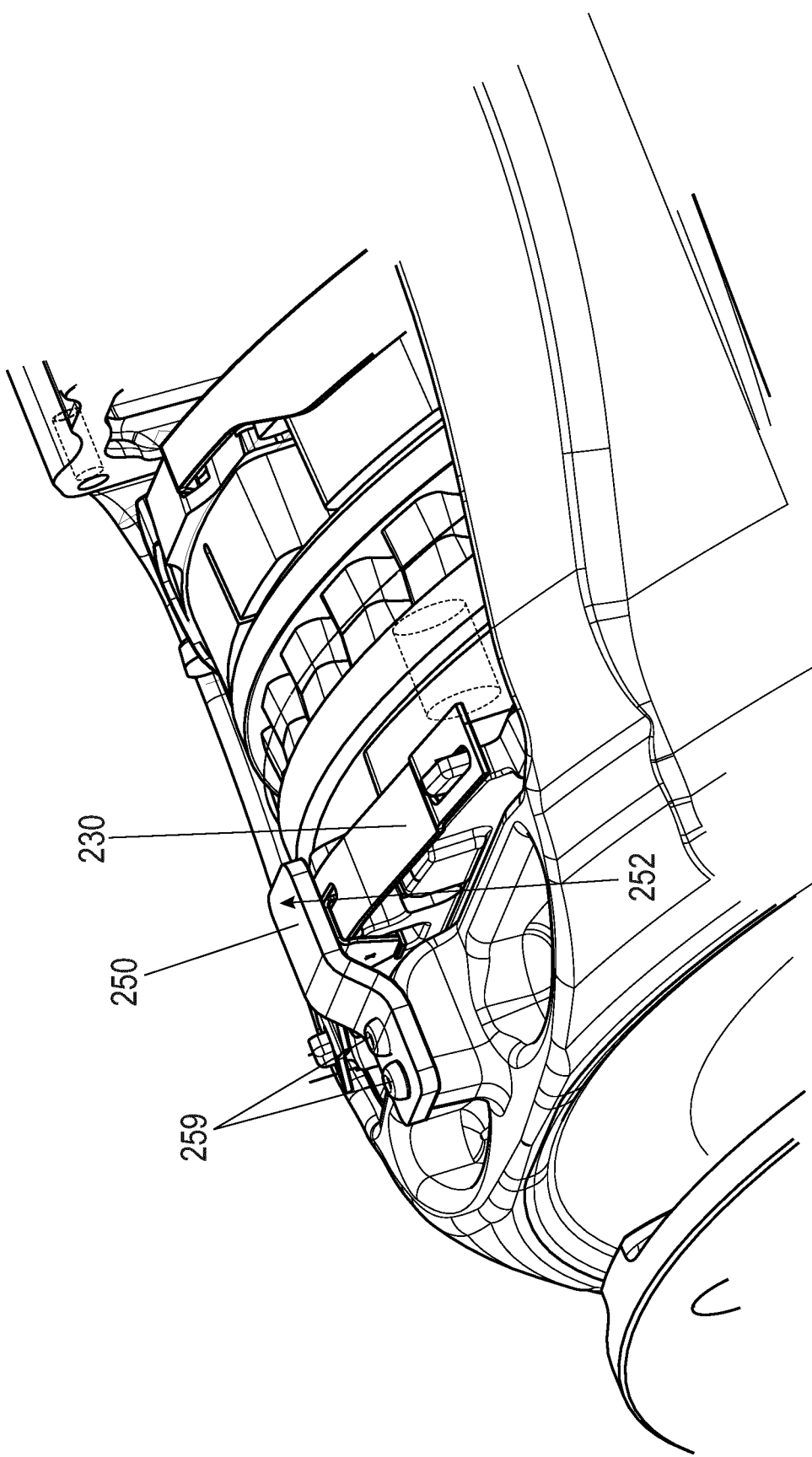
FIG. 18 shows a perspective view of a part of a fourth further disc brake according to the invention.

According to FIG. 18, the hold-down clip 250 is detachably fastened on the brake caliper 1 in a simple manner by means of one or more screws 259, which are screwed into the brake caliper 1, for example in this case in a radial direction.

Figure 19A:
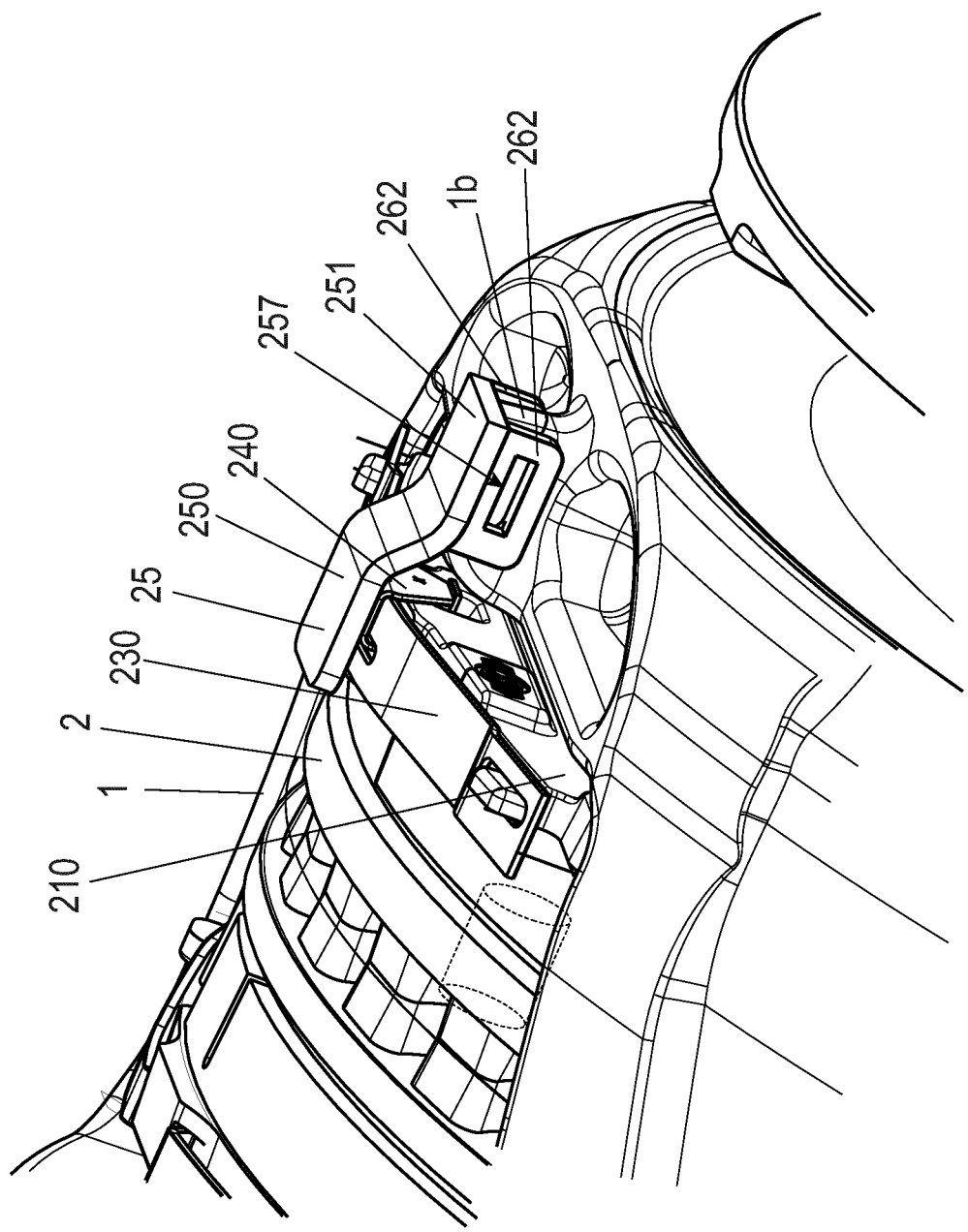
FIG. 19A shows a perspective view of a part of a fifth further disc brake according to the invention.
Figure 19B:
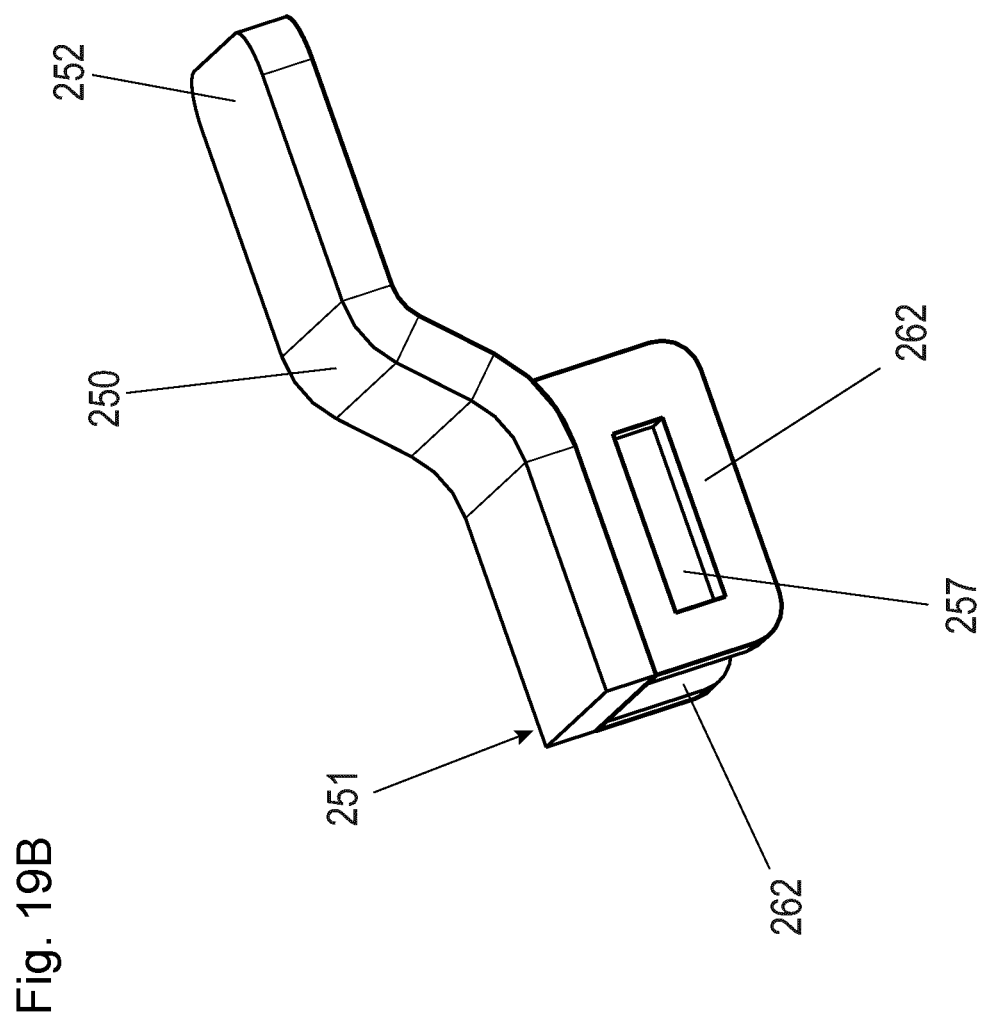
FIG. 19B shows a hold-down clip for the arrangement from FIG. 19A in a separate perspective illustration in each case.
Figure 20A:
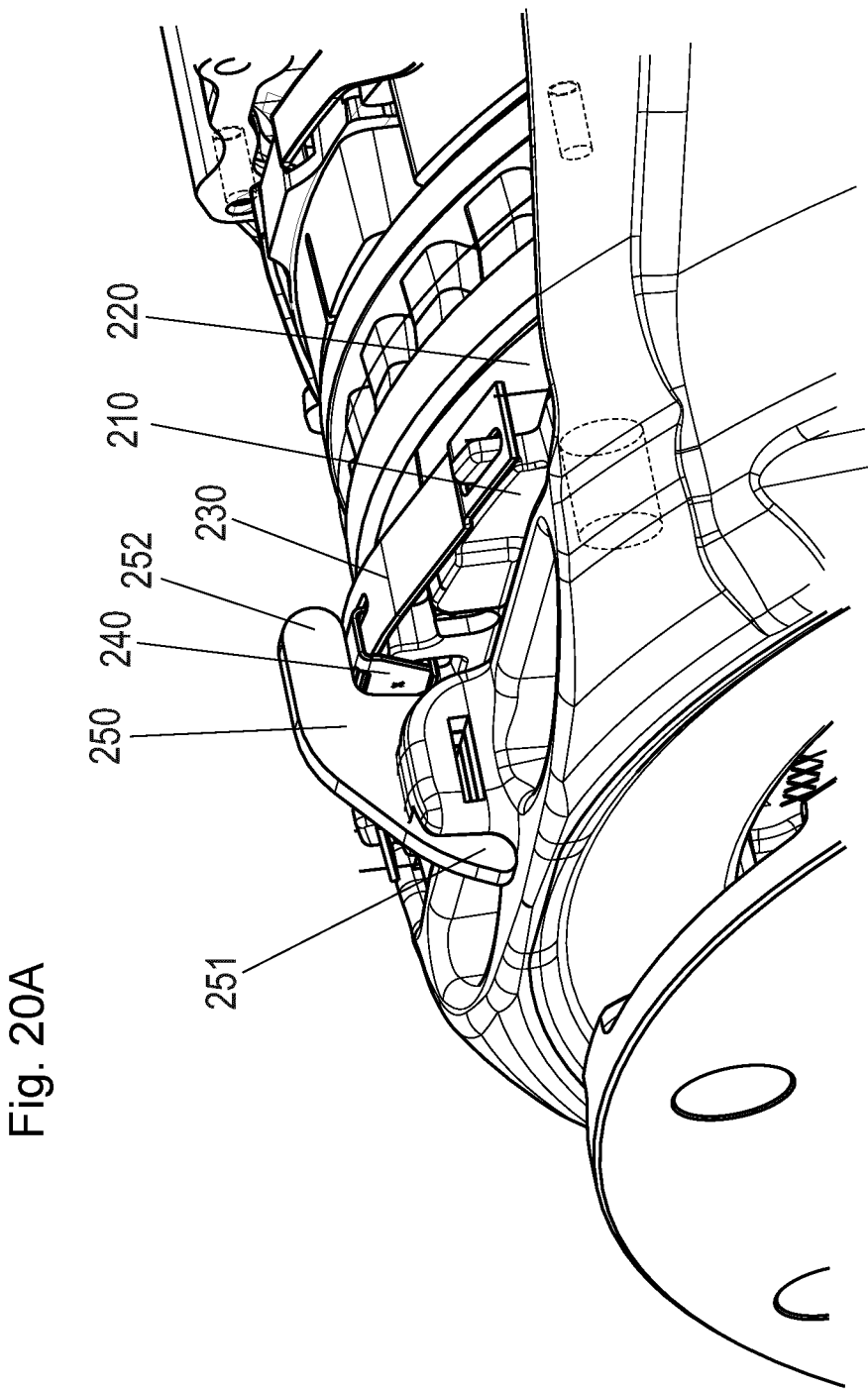
FIG. 20A shows a perspective view of a part of a further disc brake according to the invention.
Figure 20B:
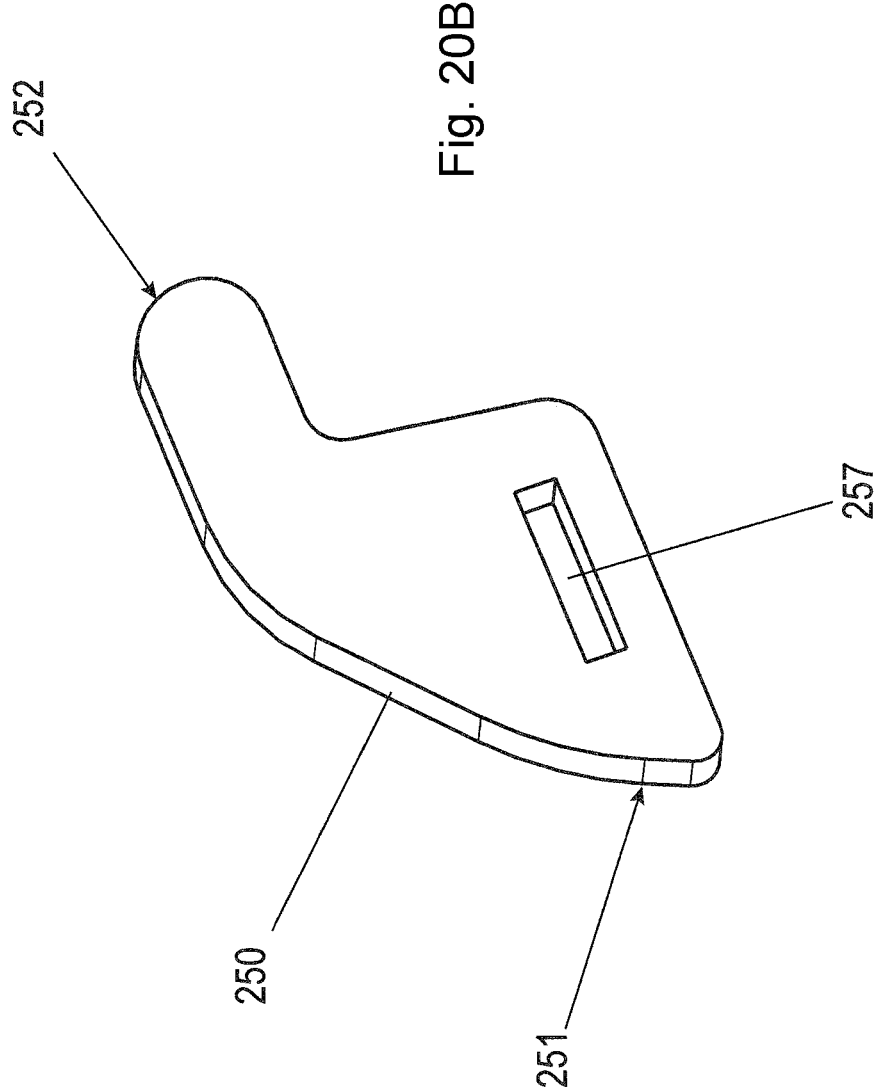
FIG. 20B shows a hold-down clip for the arrangement from FIG. 19A, B or FIG. 20A in a separate perspective illustration in each case.
Figure 21A:
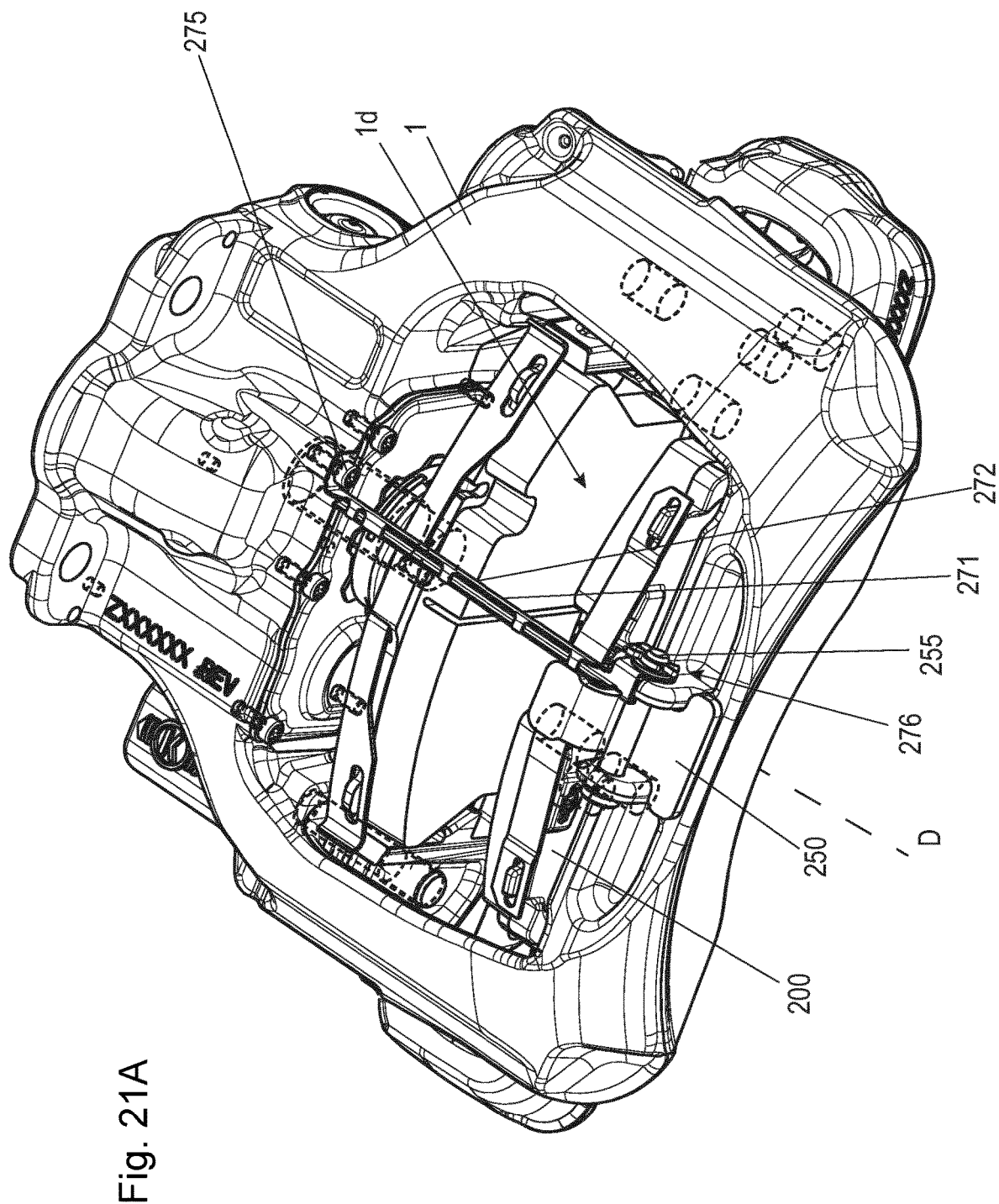
FIG. 21A shows a perspective view of a part of a sixth further disc brake according to the invention with a cable bridge.
Figure 21B:
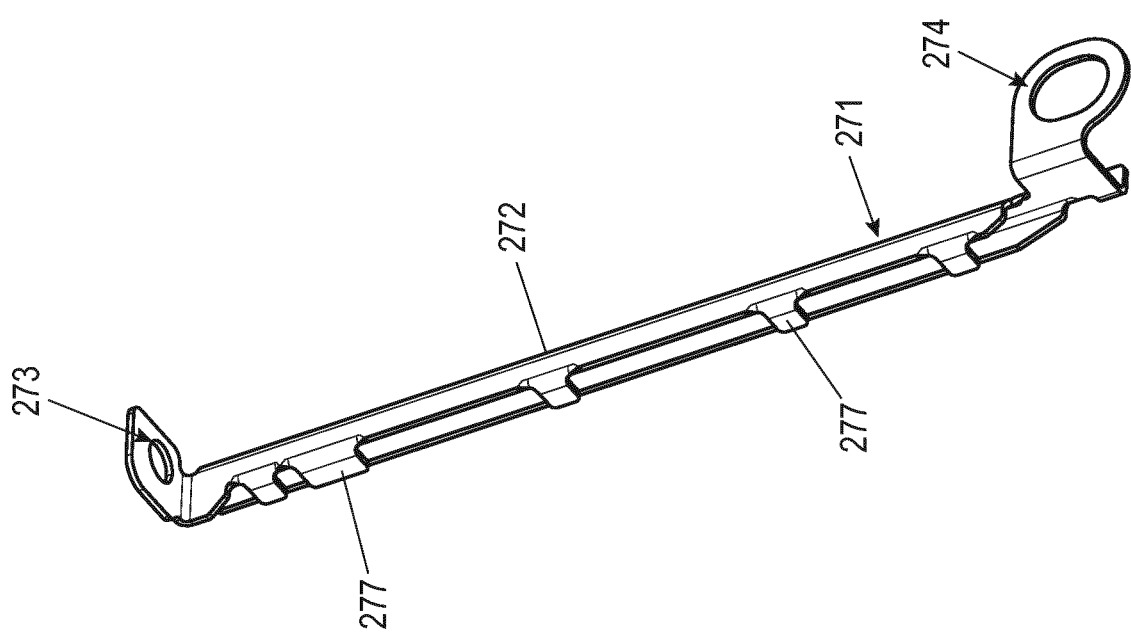
FIG. 21B shows the cable bridge of the disc brake from FIG. 21A.

A or the passage opening 257 or the passage openings 257 for the bolt or pin 255 for fastening or holding the hold-down clip 250 may have a circular cross section or some other cross section, for example a polygonal cross section (illustrated in FIG. 19A, FIG. 19B; FIG. 20A, FIG. 20B). The pin may, in a manner adapted to this, have the shape of a circular pin or of a flat web (not illustrated here, which may also at one end be of curved form or have an angled portion or an enlarged head, such that it bears at one side against the passage opening and cannot slip through the latter). On the other side of the passage opening, said pin may be secured by means of a splint or a nut on a thread section or by some other suitable means. The pin 255 in the form of the flat web is inserted through one or more passage openings 257 of the hold-down clip 250 and one or more corresponding passage openings of the lug or lugs if on the brake caliper 1, and fixed. A rotation prevention means for the hold-down clip 250 is thus also realized.

The hold-down clip 250 may be produced in a variety of ways. It may be formed as a punched/bent part (see for example FIG. 19A (as a flat web which lies flat on the brake pad 200 and which has two lugs 261) or FIG. 20A (as a flat web which lies perpendicularly on the brake pad 200)), or for example as a cast part or as a part produced in some other way.

The exemplary embodiments of FIGS. 21A, 21B and 22A-22C will be considered in more detail below.

For detection of wear of the brake pads or of the friction pads 220 thereof that arises as a result of braking operations, in each case one wear sensor (not illustrated here) is integrated into each of these. In each case one signal cable (not illustrated here) is connected to the wear sensors. Said signal cable has at least one conductor, preferably at least one electrical conductor. The at least one conductor may be surrounded by an insulator and/or by a cable sheath.

At least one of the signal cables is laid so as to fully cross the opening 1d of the brake caliper 1 and (in a manner that can be seen here) is led to a brake pad wear determining and possibly display device of the disc brake. For this purpose, the signal cable is arranged and held on a cable bridge 271. The cable bridge 271 fully bridges or crosses the opening 1d of the brake caliper 1. It preferably fully bridges the opening 1d in an axial direction parallel or substantially parallel to the brake disc axis of rotation or axis.

The cable bridge 271 may be composed of metal. It may furthermore advantageously be easily formed as a punched/bent part composed of a metal sheet. It may however also be composed of another material.

The cable bridge 271 preferably has a central web section 272. Said web section 272 is in this case of straight design. Here, in the installed state, said web section extends parallel to or substantially parallel to the brake disc axis of rotation D.

The web section 272 preferably has first and second fastening means 273 and 274 at its two mutually averted ends. Said first and second fastening means 273 and 274 of the cable holder or of the cable bridge 271 serve for the fastening of the cable holder 271 to corresponding first and second counterpart fastening means 275, 276 of the brake caliper 1—FIG. 21—or of an element fastened to the brake caliper 1—FIG. 22.

The first and second fastening means 273 and 274 of the cable holder or of the cable bridge 271 and the corresponding first and second counterpart fastening means 275, 276 of the brake caliper 1 may, on one side of the opening 1d, be formed a substantially tolerance-free first fastening and, on the other side of the opening 1d of the brake caliper 1, a second fastening with tolerance-compensating action.

For this purpose, in a variant which is easy to realize in terms of structural design, the first and second fastening means 273, 274 may be formed as a circular hole 273 and as an elongated hole 274 at or in the opposite ends of the cable holder 271. The corresponding counterpart fastening means 275, 276 may then for example be formed, in an advantageous and simple manner, as screws 275, 276 or pins or the like of the brake caliper 1 which are fixed to the brake caliper 1, for example fixedly screwed into bores of the brake caliper 1.

If the one end of the hold-down clip 250 which is fastened to the brake caliper 1 is fixed in form-fitting fashion to the brake caliper 1 by means of a pin 255 (FIG. 1A, FIG. 9; FIG. 21), said pin 255 fixed to the brake caliper 1 can extend through the bore 276—preferably the elongated hole for tolerance compensation purposes. The elongated hole 276 can then be displaced on the pin. The end of the hold-down clip 250 with the bore 276 is then arranged in the manner of a washer between a head of the pin 255 and an abutment surface of the brake caliper 1. This fastening variant is structurally simple and inexpensive, because a single fastening means—the pin 255—is utilized twofold.

The cross section of the web section 272 of the cable holder 271 is, in a preferred embodiment, preferably U-shaped. Here, the closed side of the U preferably faces toward the brake pads 100, 200 in order to thus realize shielding against heat that is radiated by the brake disc and the brake pads. The signal cable can then be placed into and fastened in the U-shaped web section 272. For this purpose, lugs 277 may be formed on the web section 272, which lugs are, after the placement of the signal cable 271 into the web section 272, bent such that the signal cable is, in sections, held entirely or in substantially circumferentially closed fashion on the web section 272.

The web section 272 may freely engage over the opening 1d. This means that the web section 272 is fastened only at the two ends—for example in the manner described above—to the brake caliper 1, and preferably not to other elements of the disc brake.

The web section 272 may however also optionally or alternatively (at one of its ends or more centrally in the web region 271) be fixed to the hold-down clip 250 which does not fully cross the opening 1d, and which holds down only one of the two brake pads 100, 200.

Figure 22A:
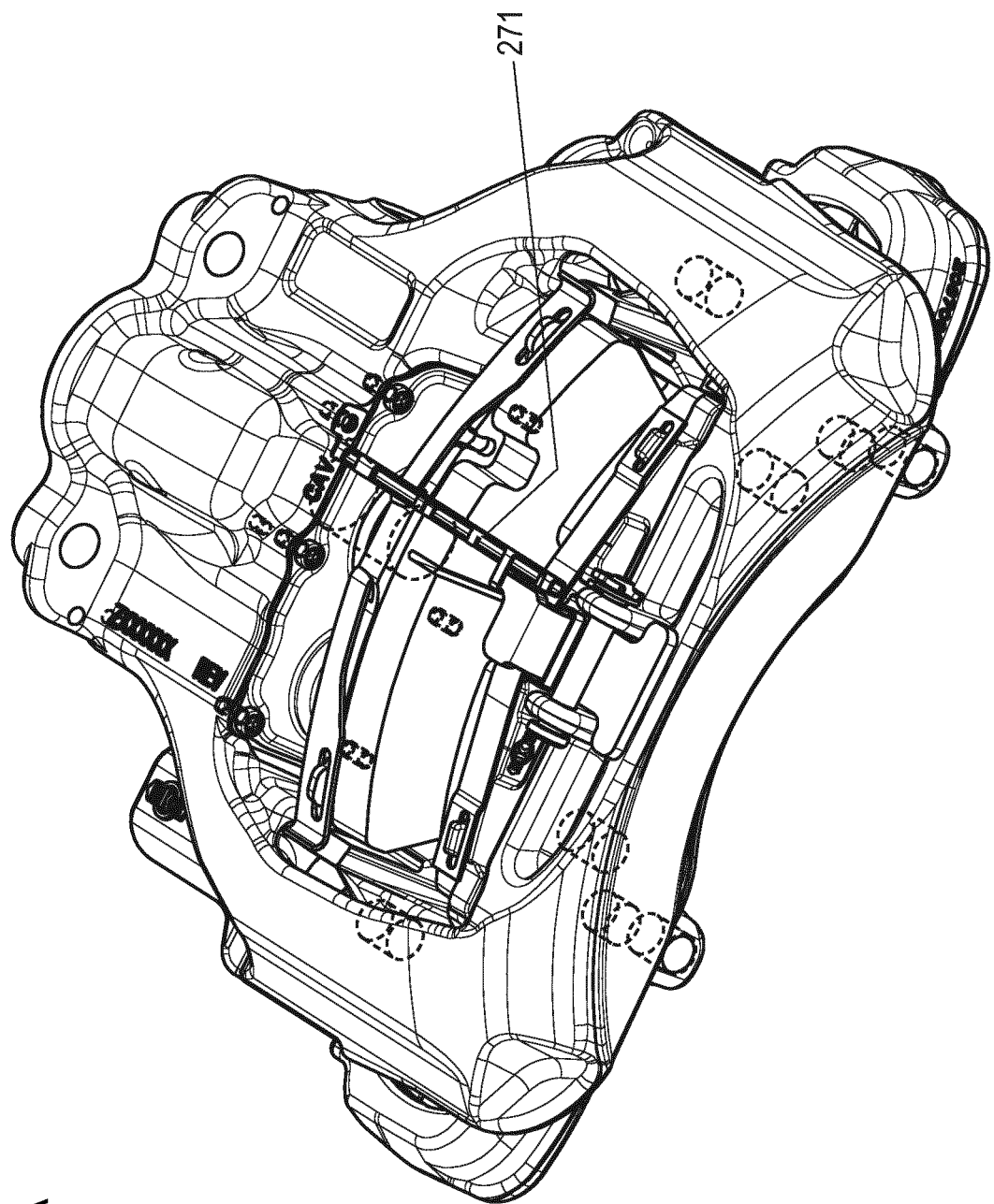
FIG. 22A shows a perspective view of a part of a seventh further disc brake according to the invention with a cable bridge designed differently to that in FIG. 21A.
Figure 22B:
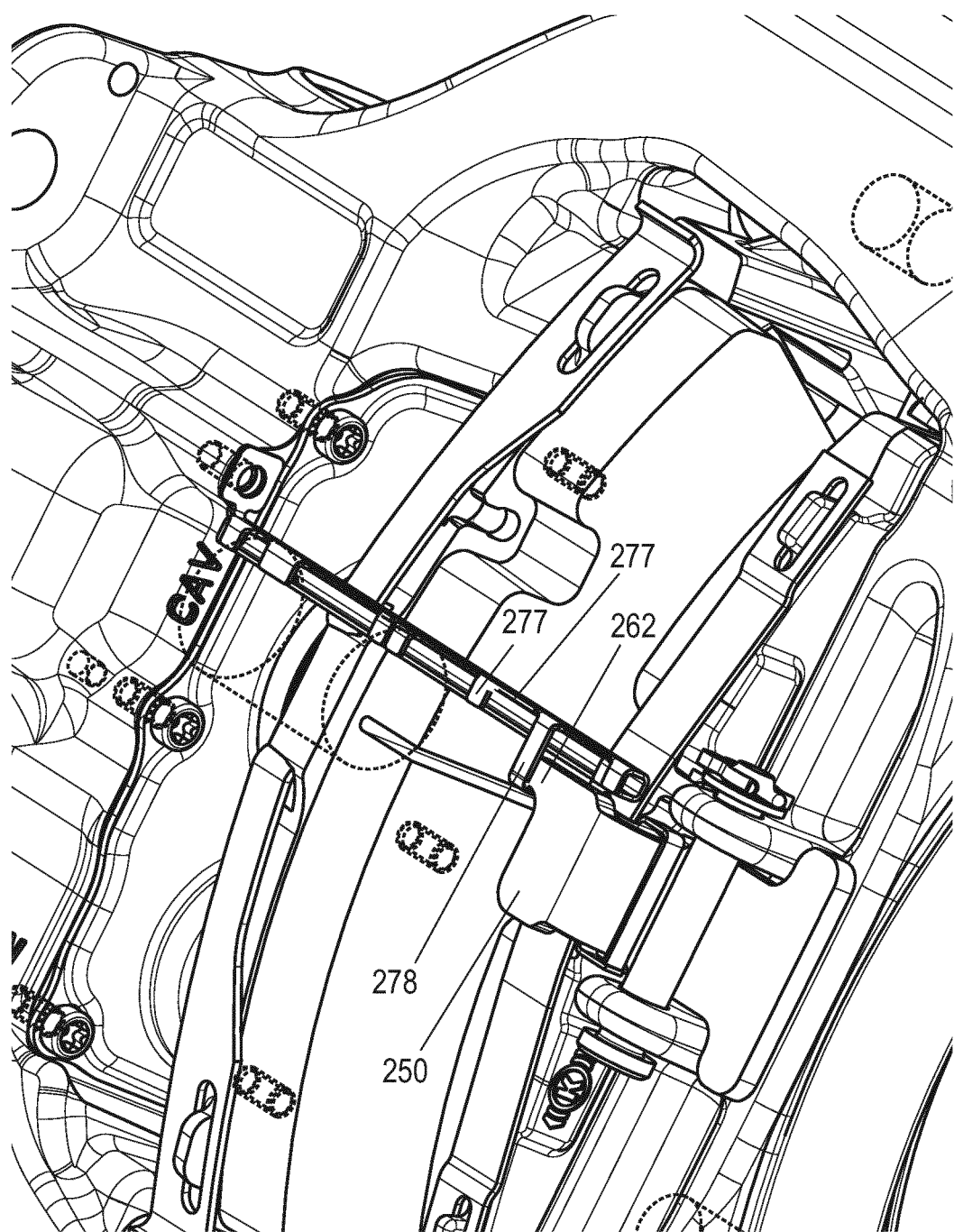
FIG. 22B shows an enlarged detail from FIG. 22A.
Figure 22C:
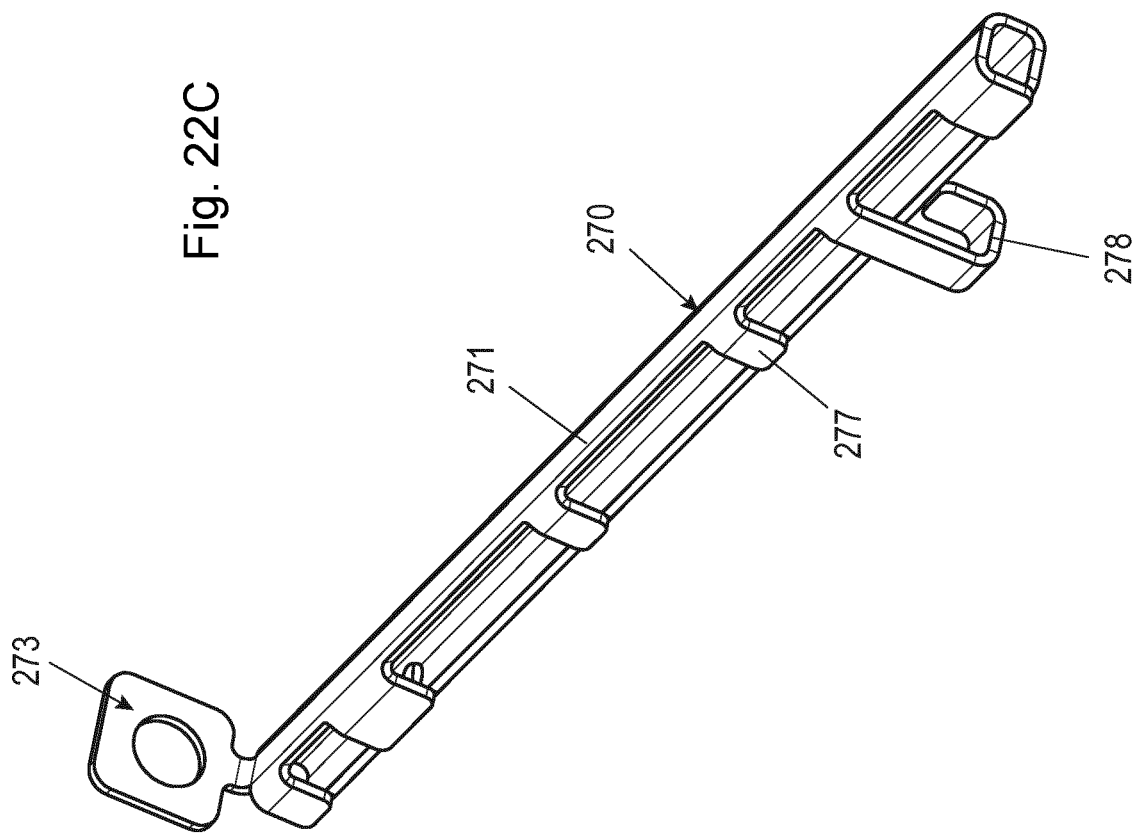
FIG. 22C shows the cable bridge of the disc brake from FIG. 22A.
Figure 22D:
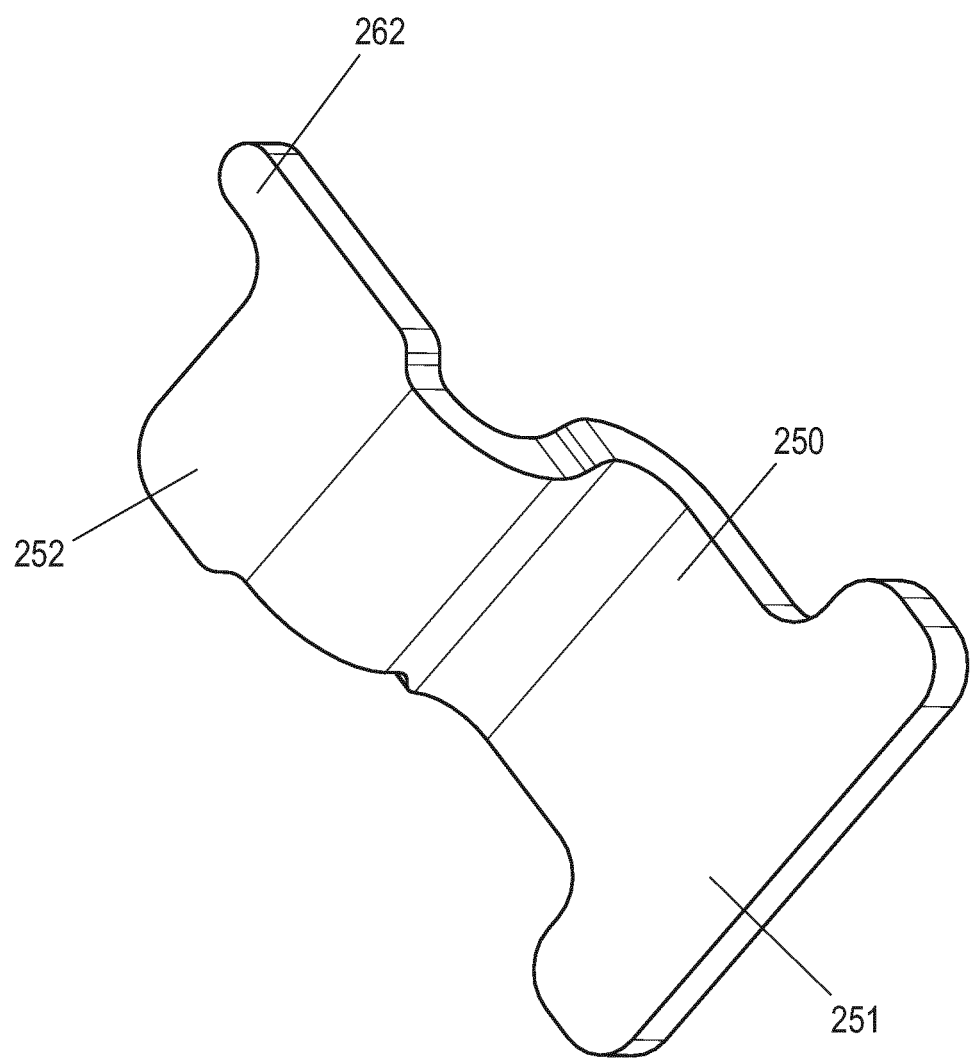
FIG. 22D shows a pad-holding clip of the disc brake from FIG. 22A.

For this purpose, it is advantageous if a further lug 278 of the web section 272 is fixed to the pad-holding clip 250 (see FIGS. 22A-22C). This fixing may be realized in a variety of ways. Accordingly, in one preferred variant, it may be realized by virtue of the lug 278 being laid around a web 262 on the hold-down clip 250 and encompassing said web. Here, it is furthermore advantageous if the web 272 projects in the manner of a type of finger element axially from the end of the hold-down clip 250 at which finger element said hold-down clip radially holds down the brake pad assigned thereto. In this way, it is possible in a simple manner for the hold-down clip 250 and the web section 271 to move relative to one another, in particular pivot relative to one another, to a limited extent. Such relative movements may arise during braking operations. The lug 278 may thus on its own form the counterpart fastening means 276. The hold-down clip 250 is a part fastened to the brake caliper 1, such that the cable bridge 271 is thus in turn fastened—indirectly—to the brake caliper 1.

The web section 272 may however also be fastened in some other way, for example by means of at least one screw or a rivet, to the pad-holding clip 250.

It is thus advantageous—abstracting the variant of FIG. 22—if the cable bridge 271 is fastened in force-fitting and/or form-fitting fashion to the hold-down clip 250, in particular to the web 262 of the hold-down clip 250. A force fit may be realized (not illustrated) for example by virtue of the cable bridge 272 being laterally attached with clamping action to the hold-down clip 250. Here, in particular, a lateral—tangential—attachment in the circumferential direction to the hold-down clip 250 at a narrow side of the hold-down clip 250 is possible.

In this way, a type of cable bridge 272 is formed which preferably performs the function of cable guidance and of thermal and mechanical shielding. Here, the cable bridge 272 is, as described, fixedly attached (screw connection) at one side, on the application side, to the brake caliper 1. On the reaction side, a type of floating bearing arrangement with tolerance-compensating action is realized such that the cable bridge is fixed by means of an elongated hole to the pad-holding clip bolt or pin 255. The cable bridge 272 can thus compensate the caliper deformation in an effective manner.

The fastening may however also be realized by virtue of the pad-holding bolt or pin being configured as a fixed bearing, and the fastening to the caliper on the other side of the opening 1*d* being configured as a floating bearing.

The cable guide on the cable bridge 272 is designed to be as far remote from the brake disc as possible in order to keep the temperature loading as low as possible. Secondly, the cable guide is positioned so as to be situated in the shadow of the axial tension struts of the brake caliper 1 so as to be protected in an effective manner against foreign bodies (for example ice, dirt, stones) entrained by the wheel rim. This makes it possible for the sheet-metal thickness at the cable guide to be reduced to a minimum.

The invention is not limited by the exemplary embodiments described above. The invention may be modified in a variety of ways within the scope of the appended claims.

LIST OF REFERENCE DESIGNATIONS

| Brake caliper | 1 |
|---|---|
| Application section | 1a |
| Caliper rear section | 1b |
| Tension strut | 1c |
| Opening | 1d |
| Openings (bores) | 1e |
| Lugs | 1f |
| Recess | 1g |
| Brake disc | 2 |
| Brake disc axis of rotation | 2a |
| Brake carrier | 3 |
| Guide beams | 4 |
| Pad slots | 11, 12 |
| Support surfaces | 11a, 11b; 12a, 12b |
| Pad slot base | 11c; 12c |
| Brake carrier horns | 13, 14 and 15, 16 |
| Undercut | 17, 18 |
| Brake pad | 100 |
| Pad carrier | 110 |
| Side edges | 111, 112 |
| Projection | 113, 114 |
| Holding clip | 115 |
| Lugs | 116, 117 |
| Friction pad | 120 |
| Pad spring | 130 |
| Slot | 131, 132 |
| Ends | 133, 134 |
| Brake pad | 200 |
| Pad carrier | 210 |
| Side edges | 211, 212 |
| Lugs | 213, 214 |
| Passage hole | 215 |
| Opening | 216 |
| Form-fit means | 217 |
| Friction pad | 220 |
| Pad spring | 230 |
| Slots | 231, 232, 233 |
| Cover | 240 |
| Limb | 241, 242 |
| Web | 243 |
| Connecting web | 244 |
| Ring | 245 |
| Hold-down clip | 250 |
| End | 251 |
| End | 252 |
| Bore | 253 |
| Pin | 254 |
| Bolt/pin | 255 |
| Spring | 256 |
| Passage opening | 257 |
| Projection | 258 |
| Screws | 259 |
| Securing element | 260 |
| Lugs | 261 |
| Web | 262 |
| Contours | 2501, 2502 |
| Cable bridge | 271 |
| Web section | 272 |
| Fastening means | 273, 274 |
| Counterpart fastening means | 275, 276 |
| Lugs | 277 |
| Lug | 278 |
| Direction of rotation | U |
| Axis of rotation | D |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a utility vehicle, comprising:
   a) a brake caliper which engages over a brake disc and which is designed as a sliding caliper and which is arranged on a positionally fixed brake carrier, and having an application device for applying the brake;
   b) two brake pads which each have a pad carrier and a friction pad fastened to said pad carrier and of which one, as an application-side brake pad, is pressable by the application device against the brake disc on one side of the brake disc and of which the other, as a reaction-side brake pad, is arranged on the opposite side of the brake disc and which are each inserted into a pad slot;
   c) a central caliper opening of the brake caliper over the brake disc, through which caliper opening the two brake pads are inserted into their respective pad slots, wherein
   d) a hold-down clip designed so as to radially secure only the reaction-side brake pad one of the two brake pads in a reaction side pade slot of the respective pad slots and
   e) the hold-down clip is, with its end averted from the reaction-side brake pad, held on the brake caliper, wherein the application-side brake pad is secured radially in an application side pad slot of the respective pad slots in the fixed brake carrier by form-fitting mutually-opposite lateral projections of the application-side pad carrier engaging corresponding undercuts formed in mutually-opposite application-side brake carrier horns of the fixed brake carrier.

2. The disc brake as claimed in claim 1, wherein the hold-down clip engages over only the reaction-side brake pad entirely or partially axially parallel with respect to the brake disc and radially secures it in its pad slot.

3. The disc brake as claimed in claim 1, wherein the hold-down clip is, with its end averted from the reaction-side brake pad, held releasably on the brake caliper.

4. The disc brake as claimed in claim 1, wherein
the hold-down clip is fixed to the reaction-side brake pad by being non-releasably fixed to a part of the reaction-side brake pad.

5. The disc brake as claimed in claim 4, wherein
the hold-down clip is fixed to a cover and/or to a pad spring of the reaction-side brake pad.

6. The disc brake as claimed in claim 5, wherein
the pad spring entirely or partially extends through the cover.

7. The disc brake as claimed in claim 5, wherein
the pad spring is formed in one piece with the cover or is cohesively connected to the cover.

8. The disc brake as claimed in claim 5, wherein
the hold-down clip is connected in form-fitting fashion to the cover.

9. The disc brake as claimed in claim 1, wherein
the pad slot of the reaction-side brake pad is formed in the brake carrier or in the brake caliper, and
the pad slot of the application-side brake pad is formed in the brake carrier.

10. The disc brake as claimed in claim 1, wherein
the hold-down clip is releasably or non-releasably fastened to the brake caliper or is formed in one piece therewith.

11. The disc brake as claimed in claim 1, further comprising:
a cable bridge on which at least one signal cable is arranged and held, which cable bridge bridges the opening of the brake caliper and is fastened directly or indirectly to the brake caliper in at least two regions.

12. The disc brake as claimed in claim 11, wherein
the cable bridge has a web section which, at its two mutually averted ends, has first and second fasteners which are designed for fastening the cable bridge to corresponding first and second counterpart fasteners of the brake caliper.

13. The disc brake as claimed in claim 12, wherein
the first and second fasteners of the cable bridge and the corresponding first and second counterpart fasteners of the brake caliper form, on one side of the opening, a substantially tolerance-free first fastening and, on the other side of the opening of the brake caliper, a second fastening with tolerance-compensating action.

14. The disc brake as claimed in claim 12, wherein
the first and second fasteners are formed as a hole and as an elongated hole.

15. The disc brake as claimed in claim 12, wherein
the first and second fasteners are formed as a hole and as an elongated hole, which are each extended through by a screw or a pin which are fixed to the brake caliper.

16. The disc brake as claimed in claim 15, wherein
the pin also serves for the fastening of the hold-down clip.

17. The disc brake as claimed in claim 11, wherein
the cable bridge is fastened in force-fitting and/or form-fitting fashion to a web of the hold-down clip.

18. A reaction-side brake pad for a disc brake as claimed in claim 1, which reaction-side brake pad has a pad carrier and a friction pad fastened thereto,
wherein said reaction-side brake pad is designed for interacting with the hold-down clip such that the hold-down clip radially secures only the reaction-side brake pad in its pad slot on the disc brake.

19. The brake pad as claimed in claim 18, wherein
said reaction-side brake pad is designed as a structural unit with the hold-down clip such that the hold-down clip radially secures only the reaction-side brake pad in its pad slot on a disc brake.

20. The brake pad as claimed in claim 18, wherein
the hold-down clip is non-detachably fixed to the reaction-side brake pad.

21. The brake pad as claimed in claim 18, wherein
the hold-down clip is fastened to a cover, a pad spring, or the cover and the pad spring.

22. The brake pad as claimed in claim 21, wherein
the hold-down clip is formed in one piece with the cover.

23. The brake pad as claimed in claim 21, wherein
the hold-down clip is connected to the cover cohesively, in a form-fitting fashion, or cohesively and in form-fitting fashion.

24. A brake pad set, comprising the reaction-side brake pad as claimed in claim 18 and the application-side brake pad which is secured radially in the brake carrier by the form-fitting mutually-opposite lateral projections of the application-side brake pad carrier as claimed in claim 18.

25. A brake pad set, comprising:
a reaction-side brake pad having friction material arranged on a reaction-side pad carrier; and
an application-side brake pad having friction material arranged on an application-side pad carrier,
wherein
the application-side brake pad includes mutually-opposite lateral projections on the application-side pad carrier that are configured to cooperate with corresponding recesses in application-side brake horns of a brake carrier of a disc brake for a utility vehicle to secure the application-side brake pad in the disc brake without an application-side brake pad holding device located radially outward of the application-side brake pad, and
the reaction-side brake pad is configured to be secured in a reaction-side pad slot of the disc brake by a hold down clip that does not extend to the application-side brake pad.

* * * * *